United States Patent
Karino et al.

(10) Patent No.: US 8,179,851 B2
(45) Date of Patent: May 15, 2012

(54) MOBILE COMMUNICATION SYSTEM, MOBILE COMMUNICATION METHOD, AND COMMUNICATION APPARATUS

(75) Inventors: Ryuichi Karino, Kawasaki (JP); Tatsuji Hamamura, Kawasaki (JP); Kenji Fukuda, Kawasaki (JP); Yoshio Tamura, Kawasaki (JP); Hajime Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 512 days.

(21) Appl. No.: 12/413,456

(22) Filed: Mar. 27, 2009

(65) Prior Publication Data

US 2009/0303947 A1 Dec. 10, 2009

(30) Foreign Application Priority Data

Jun. 5, 2008 (JP) .................. 2008-148209

(51) Int. Cl.
  *H04W 4/00* (2009.01)
(52) U.S. Cl. ....................... 370/329; 370/465
(58) Field of Classification Search .......... 370/328–329, 370/331, 335–336, 338, 341–345, 432, 437, 370/441–443, 465–466, 470, 472, 474, 476
See application file for complete search history.

(56) References Cited

U.S. PATENT DOCUMENTS

| | | | | |
|---|---|---|---|---|
| 7,451,227 B2* | 11/2008 | Lee et al. | | 709/232 |
| 2004/0218630 A1 | 11/2004 | An | | |
| 2005/0147126 A1* | 7/2005 | Qiu et al. | | 370/474 |
| 2005/0157727 A1 | 7/2005 | Date et al. | | |
| 2006/0193282 A1* | 8/2006 | Ikawa et al. | | 370/328 |
| 2007/0258429 A1 | 11/2007 | Doetsch et al. | | |
| 2008/0043614 A1* | 2/2008 | Soliman | | 370/208 |
| 2008/0165775 A1* | 7/2008 | Das et al. | | 370/392 |
| 2008/0279216 A1* | 11/2008 | Sharif-Ahmadi et al. | | 370/465 |
| 2008/0298376 A1* | 12/2008 | Takeda et al. | | 370/400 |
| 2009/0201828 A1* | 8/2009 | Samuels et al. | | 370/252 |
| 2009/0219834 A1* | 9/2009 | Babbar et al. | | 370/254 |
| 2010/0198985 A1* | 8/2010 | Kanevsky et al. | | 709/241 |

FOREIGN PATENT DOCUMENTS

| | | |
|---|---|---|
| EP | 1 853 011 | 11/2007 |
| EP | 2 182 681 | 5/2010 |
| JP | 2001-251353 | 9/2001 |
| JP | 2004-336748 | 11/2004 |
| JP | 2005-204001 | 7/2005 |
| JP | 2006-157544 | 6/2006 |
| WO | 2008/115124 | 9/2008 |

OTHER PUBLICATIONS

Extended European Search Report issued for corresponding European Patent Application No. 09156331.2, dated Jan. 21, 2011. Ericsson; "IP Fragmentation"; XP003023546; Agenda Item: 7.2.2; Document for: Discussion, decision; vol. R3-070616; 3GPP TSG-RAN WG3 #55bis; St. Julian, Malta, Mar. 27-30, 2007; [Ref.: ESR dated Jan. 21, 2011].

* cited by examiner

*Primary Examiner* — Chi H. Pham
*Assistant Examiner* — Kevin Mew
(74) *Attorney, Agent, or Firm* — Myers Wolin, LLC

(57) ABSTRACT

A mobile station-side acquirer acquires the MTU value notified by a base station-side notifier and stores the acquired MTU value in a mobile station-side memory. A mobile station-side transmitter transmits data to a destination with the data size set to be smaller than or equal to the MTU value stored in the mobile station-side memory. A base station-side acquirer acquires the MTU value of the transmission path and stores the acquired MTU value in a base station-side memory. The base station-side notifier notifies the mobile station of the MTU value stored in the base station-side memory.

10 Claims, 15 Drawing Sheets

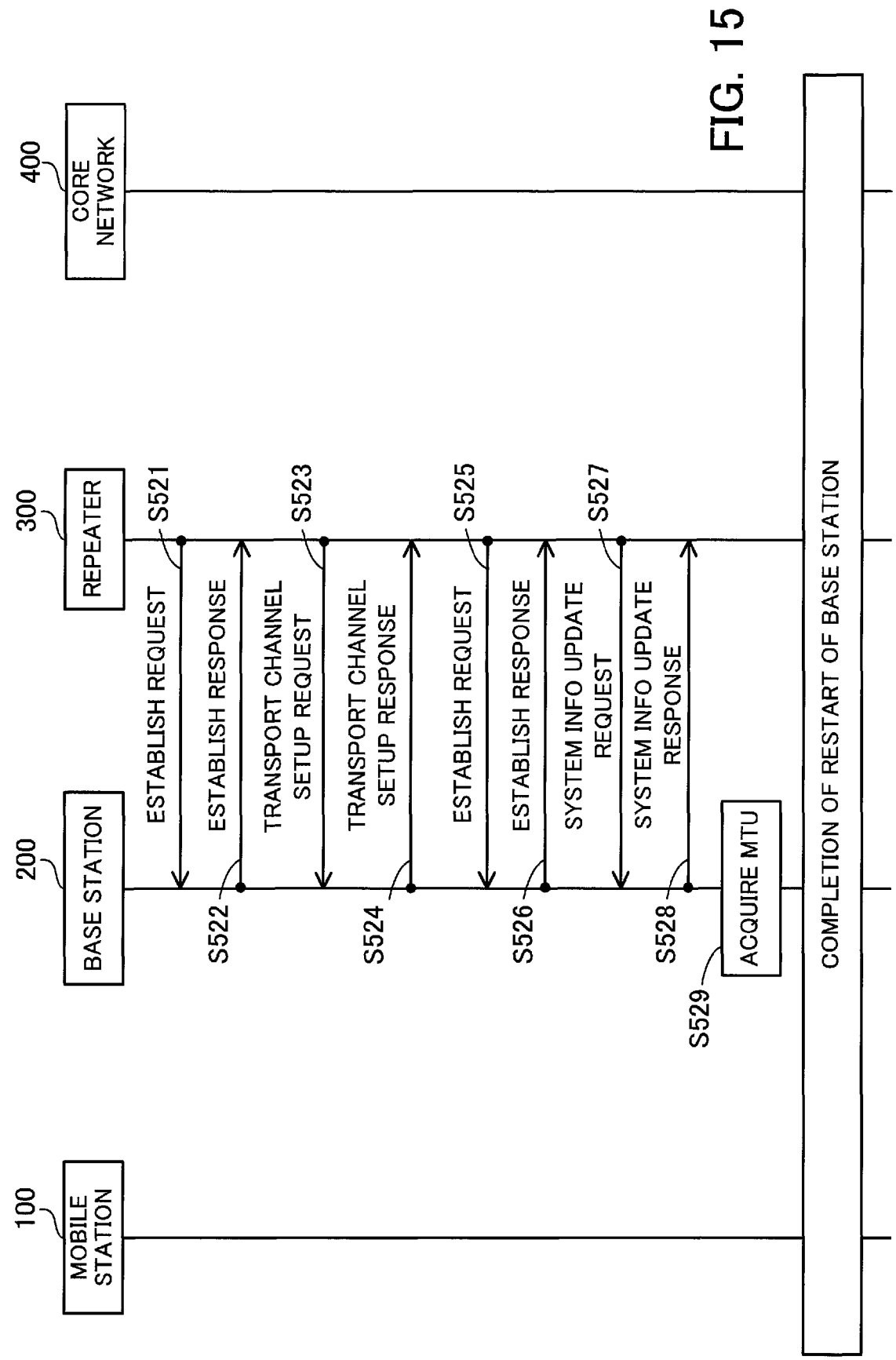

MOBILE COMMUNICATION SYSTEM, MOBILE COMMUNICATION METHOD, AND COMMUNICATION APPARATUS

CROSS-REFERENCE TO RELATED APPLICATIONS

This application is based upon and claims the benefit of priority of the prior Japanese Patent Application No. 2008-148209, filed on Jun. 5, 2008, the entire contents of which are incorporated herein by reference.

FIELD

The embodiments discussed herein are related to mobile communication systems and methods and communication apparatuses.

BACKGROUND

In data communications using packets (packet communications) such as U-Plane transmission, for example, a maximum size of a packet that can be transmitted at a time, for example, a Maximum Transmission Unit (MTU), is determined with respect to each transmission path for conveying information. When a packet with a size exceeding the MTU is received, a communication apparatus (node) on the transmission path between transmitting and receiving terminals performs fragmentation, if possible, so that the IP packet may be segmented into pieces with a size smaller than the MTU. If the packet is unable to be segmented, the fragmentation is not executed and the packet is discarded. At this time, the MTU value is notified, along with a destination unreachable message, by the ICMP (Internet Control Message Protocol), which is a protocol for forwarding IP error messages and control messages. The MTU varies in response to change in the network configuration of transmission paths attributable, for example, to handover of mobile stations during wireless communication.

If packets large in size occupy the transmission path during the packet communication, packet transmission which needs real-time performance, such as VoIP (Voice over IP), becomes unstable, possibly failing to ensure the specified transmission quality. The reason is that, where the fragmentation is executed on the network, the processing load increases, lowering the throughput of the U-Plane. To avoid this, it may be necessary that the size of packets transmitted over the network is reduced to lessen instability of the packet transmission.

Reducing the packet size, however, leads to increase of control signals and thus degradation of the transmission efficiency, as well as to increase of packet reassembly processes. Accordingly, the size of packets to be transmitted needs to be appropriately set.

Meanwhile, techniques have been known in which the MTU of a transmission path is acquired so that a terminal may transmit data packets with a size not exceeding the MTU of the transmission path (see, e.g., Japanese Laid-open Patent Publications No. 2005-204001, No. 2001-251353, No. 2004-336748, and No. 2006-157544).

However, if the transmission path MTU is acquired every time a call connection is requested from the terminal, a longer time is taken to establish the call connection.

Also, where such MTU discovery is executed by multiple terminals, the load on apparatuses constituting the transmission path increases due to the execution of the MTU discovery, giving rise to a problem that the usability of the transmission path lowers.

SUMMARY

According to an aspect of the embodiments, in a mobile communication system enabling wireless data communication between a base station and a mobile station, the base station includes a base station-side memory which stores a Maximum Transmission Unit (MTU) value indicative of a maximum size of data that can be transferred at a time over a transmission path through which data from the mobile station is transmitted, a base station-side acquirer which acquires the MTU value of the transmission path and stores the acquired MTU value in the base station-side memory, and a base station-side notifier which notifies the mobile station of the MTU value stored in the base station-side memory, and the mobile station includes a mobile station-side memory which stores the MTU value of the transmission path notified by the base station-side notifier, a mobile station-side acquirer which acquires the MTU value notified by the base station-side notifier, and stores the acquired MTU value in the mobile station-side memory, and a mobile station-side transmitter which transmits the data to a destination with a data size of the data set to be smaller than or equal to the MTU value stored in the mobile station-side memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a sequence diagram illustrating the procedure for restarting the base station in the 3G system.

DESCRIPTION OF EMBODIMENT(S)

Figure 1:
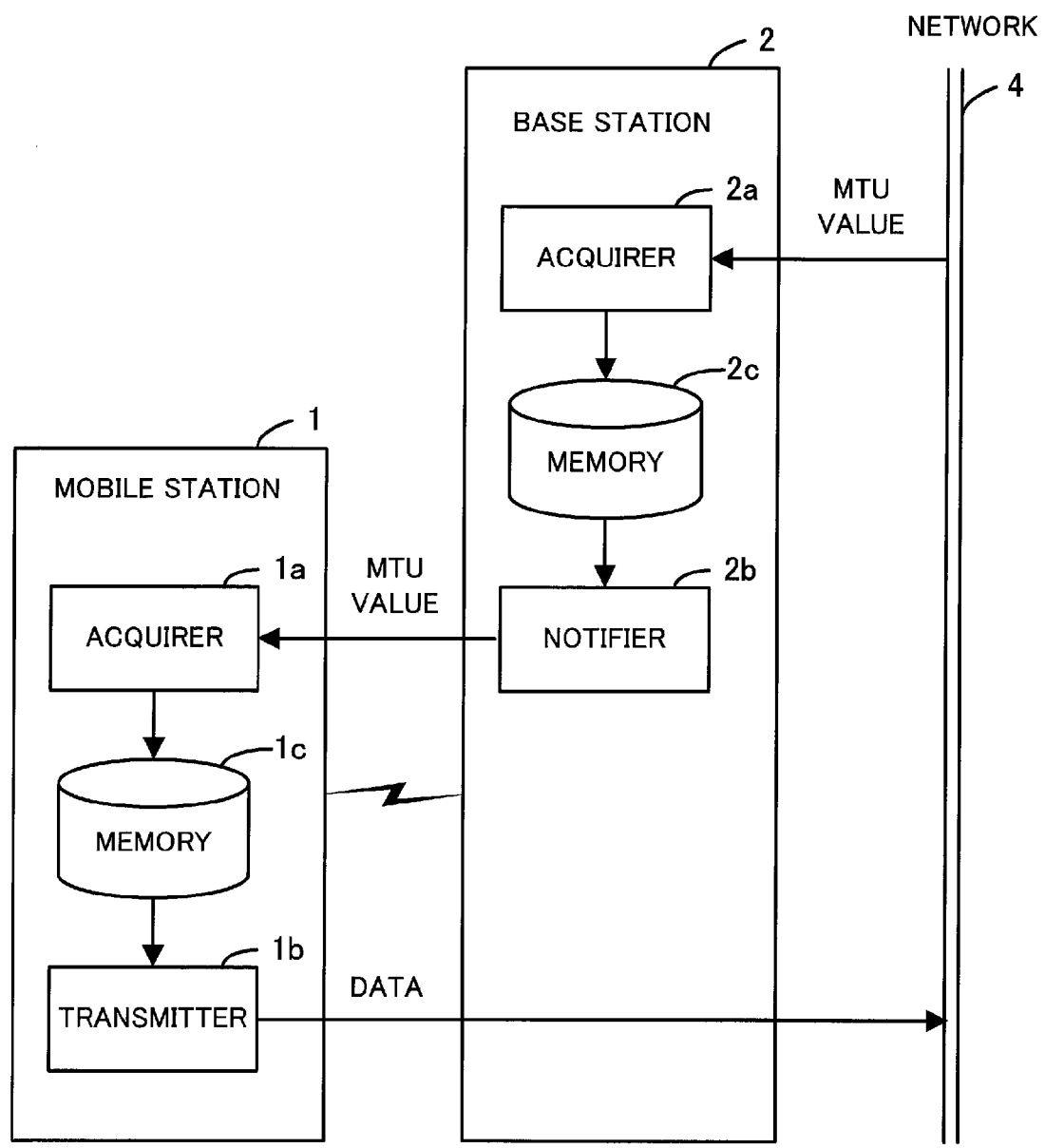
FIG. 1 schematically illustrates an embodiment.

Embodiments of the present invention will be described below with reference to the accompanying drawings, wherein like reference numerals refer to like elements throughout.

FIG. 1 schematically illustrates an embodiment. In a mobile communication system illustrated in FIG. 1, wireless data communication is performed between a base station and a mobile station to allow the mobile station to send data to a destination via the base station. The mobile communication system comprises a mobile station 1 and a base station 2. The base station 2 is connected to a network 4. The mobile station 1 is connected with a destination of data transmission (not illustrated) through the network 4.

The mobile station 1 comprises a mobile station-side acquirer 1a, a mobile station-side transmitter 1b, and a mobile station-side memory 1c.

The mobile station-side acquirer 1a acquires an MTU value notified by a base station-side notifier 2b, and stores the acquired MTU value in the mobile station-side memory 1c.

The MTU value represents a maximum size of data that can be transferred at a time over the communication network through which data from the mobile station 1 is transmitted. If data with a size exceeding the MTU value is transmitted, the transmitted data is not forwarded intact without being segmented into a smaller data size. Such data is discarded or fragmented (segmented) for transmission by a communication apparatus on the transmission path of the communication network over which the data is transmitted.

The mobile station-side transmitter 1b transmits data, the size of which is smaller than or equal to the MTU value stored in the mobile station-side memory 1c, to the destination of data transmission.

Namely, in accordance with the MTU value acquired by the mobile station-side acquirer 1a, the mobile station-side transmitter 1b sets the size of transmit data to be smaller than or equal to the MTU value, and transmits the data. Consequently, the data transmitted from the mobile station 1 reaches the destination without being fragmented or discarded at some point on the transmission path of the communication network.

The mobile station-side memory 1c stores the MTU value notified from the base station-side notifier 2b and acquired by the mobile station-side acquirer 1a. The MTU value represents the MTU of the transmission path on the network through which data from the mobile station 1 is transmitted.

The base station 2 comprises a base station-side acquirer 2a, the base station-side notifier 2b, and a base station-side memory 2c.

The base station-side acquirer 2a acquires the MTU value, which is the maximum size of data that can be transferred at a time over the transmission path through which data is transmitted from the mobile station 1 to the destination, and stores the acquired MTU value in the base station-side memory 2c. Thus, the MTU value is acquired as a criterion according to which the size of data to be transmitted from the mobile station 1 is determined.

The base station-side notifier 2b notifies the mobile station 1 of the MTU value stored in the base station-side memory 2c.

The base station-side memory 2c stores the MTU value of the transmission path through which data from the mobile station 1 is transmitted.

In the mobile communication system configured as described above, the memory 2c of the base station 2 stores the MTU value of the transmission path through which data from the mobile station 1 is transmitted, the base station-side acquirer 2a acquires the MTU value of the transmission path and stores the acquired MTU value in the base station-side memory 2c, and the base station-side notifier 2b notifies the mobile station 1 of the MTU value stored in the base station-side memory 2c. In the mobile station 1, the mobile station-side memory 1c stores the MTU value of the transmission path notified by the base station-side notifier 2b, the mobile station-side acquirer 1a acquires the MTU value notified from the base station-side notifier 2b and stores the acquired MTU value in the mobile station-side memory 1c, and the mobile station-side transmitter 1b transmits data to the destination with the size of the data set to be smaller than or equal to the MTU value stored in the mobile station-side memory 1c.

Thus, the MTU value of the transmission path is acquired and notified to the mobile station. It is therefore possible to cause the mobile station to transmit data with a size matching the MTU value of the transmission path while at the same time restraining increase in the load of apparatuses constituting the transmission path.

The embodiment will be now described in more detail with reference to the drawings.

Figure 2:
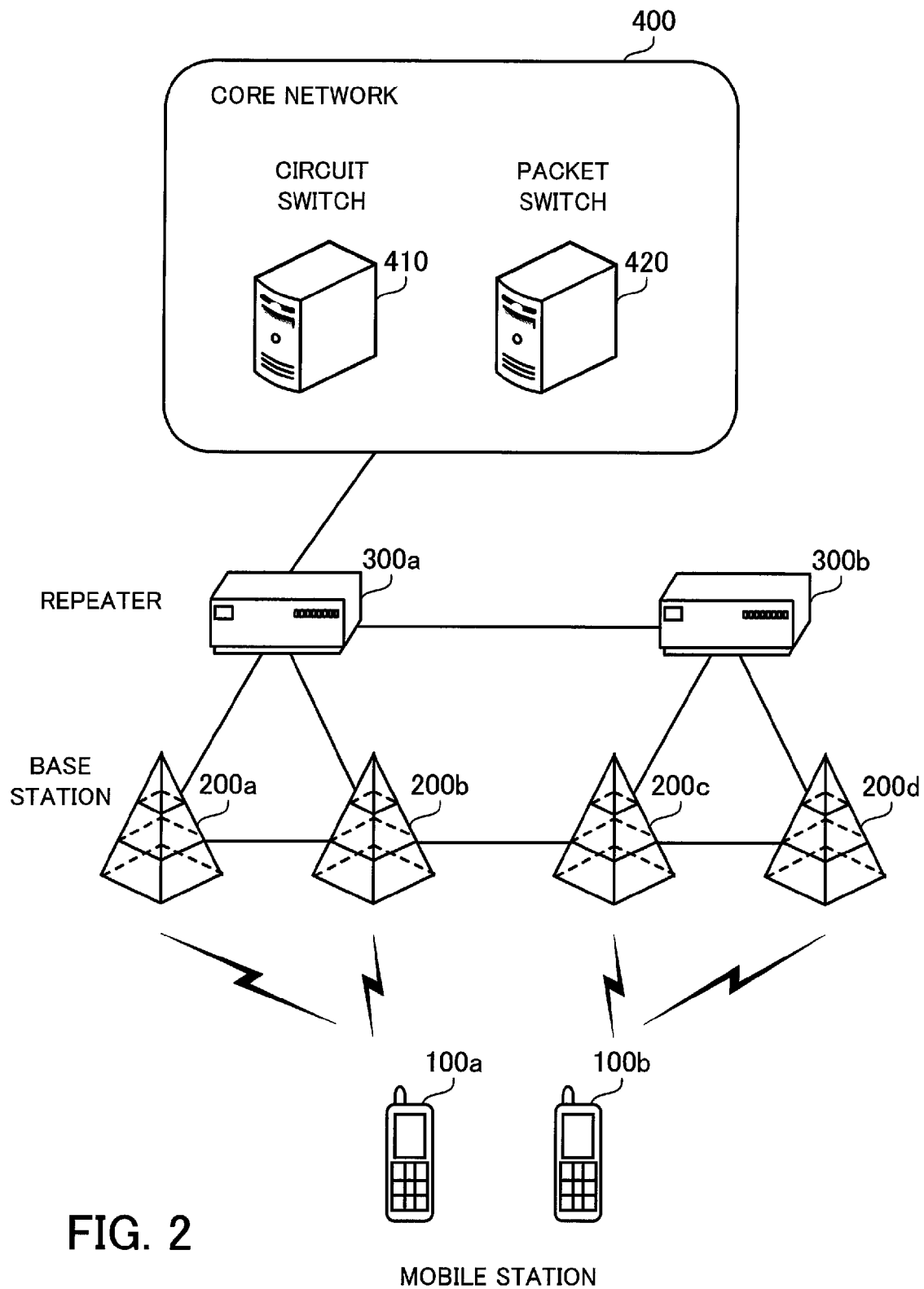
FIG. 2 illustrates a system configuration according to the embodiment.

FIG. 2 illustrates a system configuration according to the embodiment. A mobile communication system of the embodiment permits a mobile station to communicate with another mobile station via radio base stations. The mobile communication system comprises mobile stations 100a and 100b, base stations 200a to 200d, repeaters 300a and 300b, and a core network 400.

The base stations 200a and 200b and the repeater 300a are connected to each other by a wire, and the base stations 200c and 200d and the repeater 300b are connected to each other by a wire. The repeaters 300a and 300b are interconnected by a wire. Also, the repeater 300a is connected to the core network 400.

The mobile stations 100a and 100b are each a radio terminal apparatus capable of wireless communication with the base stations 200a to 200d and correspond to what is called UE (User Equipment). Each of the mobile stations 100a and 100b has a configuration and functionality identical with those of a mobile station 100 described later with reference to FIG. 3.

The base stations 200a to 200d are each a communication apparatus for performing wireless communication with the mobile stations 100a and 100b and correspond to what is called eNB (E-UTRAN Node B) or Node-B. Each of the base stations 200a to 200d has a configuration and functionality identical with those of a base station 200 described later with reference to FIG. 3.

When data is received wirelessly from the mobile station 100a or 100b, the base station 200a, 200b transmits the received data to the repeater 300a. Also, when data is received wirelessly from the mobile station 100a or 100b, the base station 200c, 200d transmits the received data to the repeater 300b. The repeater 300a and the base stations 200a and 200b are connected by the S1-AP (S1-Application Protocol), and the repeater 300b and the base stations 200c and 200d are also connected by the S1-AP.

The base stations 200a to 200d are connected to each other and capable of exchanging MTU values respectively stored therein. The base stations are connected by means of the X2-AP (X2-Application Protocol).

The repeater 300a, 300b controls the base stations under management and also transfers data. The repeater 300a, 300b corresponds to what is called MME/S-GW (Mobility Management Entity/Serving GateWay), RNC (Radio Network Controller) or BSC (Base Station Controller). Each of the repeaters 300a and 300b has a configuration and functionality identical with those of a repeater 300 described later with reference to FIG. 3.

The core network 400 is a network for relaying data exchanged between repeaters including the repeaters 300a and 300b. The core network 400 includes a circuit switch 410 and a packet switch 420.

The circuit switch 410 processes voice switching (circuit switching: CS) calls, and the packet switch 420 processes packet switching (PS) calls. The circuit switch 410 controls the traffic of CS calls, and the packet switch 420 controls the traffic of PS calls.

The mobile communication system described above can be implemented, for example, as a CDMA communication system with the HSUPA (High Speed Uplink Packet Access) function standardized by the 3GPP (Third Generation Partnership Project).

In FIG. 2, the repeaters 300a and 300b are directly connected with each other but may alternatively be connected via the core network 400.

Functions of the mobile communication system of the embodiment will be now described.

Figure 3:
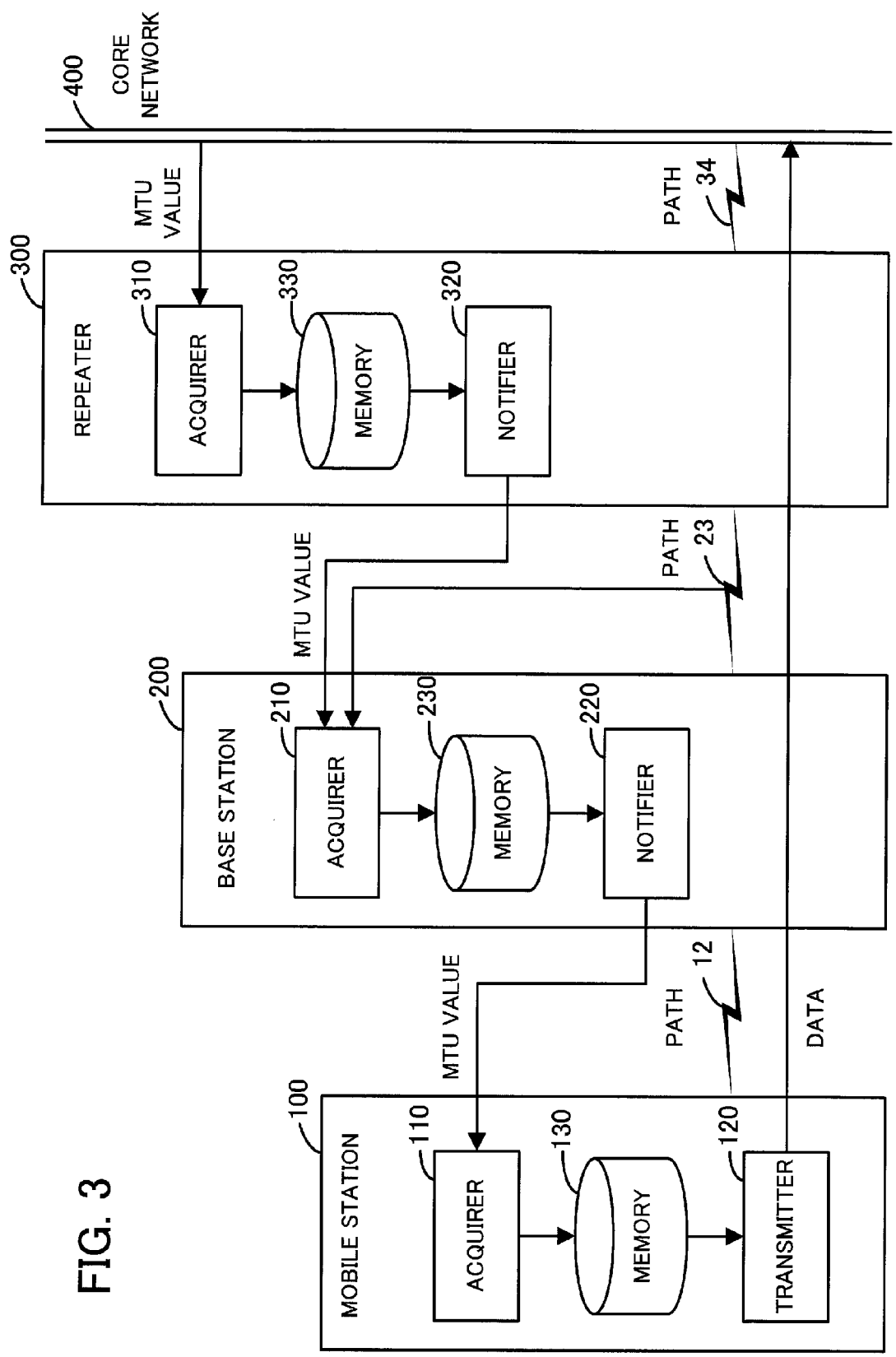
FIG. 3 is a block diagram of a mobile communication system according to the embodiment.

FIG. 3 is a block diagram of the mobile communication system of the embodiment. In the mobile communication system illustrated in FIG. 3, wireless data communication is performed between the base station and the mobile station to allow the mobile station to transmit data to a destination via the base station. The mobile communication system comprises the mobile station 100, the base station 200, and the repeater 300. The repeater 300 is connected to the core network 400. The mobile station 100 is connected with a destination of data transmission (not illustrated) through the core network 400.

With regard to the transmission path from the mobile station 100 to the destination, the network configuration of the transmission path often changes due to handover during wireless communication or other changes in communication conditions. Change of the network configuration is generally accompanied by change in the MTU value.

The mobile communication system of the embodiment has the configuration and functionality described below in order that the size of data transmitted from the mobile station 100 may match the MTU value of the transmission path.

The mobile station 100 comprises a mobile station-side acquirer 110, a mobile station-side transmitter 120, and a mobile station-side memory 130.

The mobile station-side acquirer 110 acquires an MTU value notified by a base station-side notifier 220, and stores the acquired MTU value in the mobile station-side memory 130.

The MTU value represents the maximum size of data that can be transferred at a time over the communication network via which data from the mobile station 100 is transmitted. Where data with a size exceeding the MTU value is transmitted, the transmitted data is not forwarded intact without being reduced in data size. Such data is discarded or fragmented (segmented) for transmission by a communication apparatus on the transmission path of the communication network through which the data is transmitted.

The mobile station-side transmitter 120 sends data, the size of which is smaller than or equal to the MTU value stored in the mobile station-side memory 130, to the base station 200 via a transmission path 12. The data transmitted from the mobile station-side transmitter 120 is forwarded to the destination via the transmission path 12, the base station 200, a transmission path 23, the repeater 300, a transmission path 34, and the core network 400.

Thus, in accordance with the MTU value acquired by the mobile station-side acquirer 110, the mobile station-side transmitter 120 sets the data size to be smaller than or equal to the MTU value, and transmits data with the set size. Consequently, the data transmitted from the mobile station 100 is forwarded to the destination without being fragmented or discarded at some point on the transmission path of the communication network.

The mobile station-side memory 130 stores the MTU value notified from the base station-side notifier 220 and acquired by the mobile station-side acquirer 110. The MTU value represents the MTU of the transmission path on the network through which the data from the mobile station 100 is transmitted.

The base station 200 supports the Path MTU according to the ICMP. The base station 200 obtains the MTU value of the transmission path by the Path MTU discovery utilizing the ICMP.

The base station 200 comprises a base station-side acquirer 210, the base station-side notifier 220, and a base station-side memory 230.

The base station-side acquirer 210 acquires the MTU value of the transmission path 12 through which data is transmitted from the mobile station 100 to the destination, and stores the acquired MTU value in the base station-side memory 230. Thus, the MTU value is acquired as a criterion according to which the size of data to be transmitted from the mobile station 100 is determined.

Also, the base station-side acquirer 210 acquires an MTU value notified by a repeater-side notifier 320, and stores the acquired MTU value in the base station-side memory 230.

Further, at the time of handover of the mobile station 100, the base station-side acquirer 210 acquires an MTU value of a destination-side transmission path 23 connected to a destination base station (not illustrated), which is a base station to which the mobile station 100 is connected after the handover (i.e., the MTU value of the transmission path from the destination base station to the repeater 300), and stores the acquired MTU value in the base station-side memory 230. The process executed in the mobile communication system of the embodiment at the time of handover will be described in detail later with reference to FIGS. 11 and 12.

Moreover, when operation of the base station 200 is started, the base station-side acquirer 210 acquires the MTU value notified by the repeater-side notifier 320, and stores the acquired MTU value in the base station-side memory 230.

In addition, the base station-side acquirer 210 acquires the MTU value of the transmission path at predetermined intervals of time and updates the MTU value stored in the base station-side memory 230 with the acquired MTU value. Thus, the path MTU discovery of the base station 200 is executed independently of the start of data communication of the mobile station 100.

The base station-side notifier 220 notifies the mobile station 100 of the MTU value stored in the base station-side memory 230.

Also, when the MTU value acquired from the destination base station is stored in the base station-side memory 230, the base station-side notifier 220 notifies the mobile station 100 of the MTU value stored in the base station-side memory 230 and acquired from the destination base station.

Further, when a call connection for data transmission is initiated at the mobile station 100, the base station-side notifier 220 notifies the mobile station 100 of the MTU value stored in the base station-side memory 230.

Specifically, the base station-side notifier 220 includes, in a message for establishing a call connection with the mobile station 100, the MTU value stored in the base station-side memory 230. Then, the base station-side notifier 220 sends the message including the MTU value to the mobile station 100, thereby notifying the mobile station 100 of the MTU value stored in the base station-side memory 230.

The base station-side memory 230 stores the MTU value of the transmission path 12 through which data from the mobile station 100 is transmitted.

The repeater 300 comprises a repeater-side acquirer 310, the repeater-side notifier 320, and a repeater-side memory 330.

The repeater-side acquirer 310 acquires, at predetermined intervals of time, the MTU value of the destination-side transmission path connected to the destination of data transmission from the mobile station 100 (i.e., the MTU value of the transmission path from the repeater-side acquirer 310 to the destination via the transmission path 34 and the core network 400). In this case, the repeater 300 acquires the MTU value of the transmission path by the path MTU discovery utilizing the ICMP, like the base station 200. Subsequently, the repeater-side acquirer 310 updates the MTU value stored in the repeater-side memory 330 with the acquired MTU value. Consequently, the MTU value stored in the repeater-side memory 330 is periodically updated to the latest value reflecting change in the topology of the communication network for transmitting data. Also, the path MTU discovery of the repeater 300 is executed independently of the start of data communication of the mobile station 100.

The repeater-side notifier 320 notifies the acquirer 210 in the base station 200 of the MTU value stored in the repeater-side memory 330.

Also, when operation of the base station 200 is started, the repeater-side notifier 320 notifies the base station-side acquirer 210 of the MTU value stored in the repeater-side memory 330.

The repeater-side notifier 320 includes, in a message for establishing a call connection with the mobile station 100, the MTU value stored in the repeater-side memory 330. Then, the repeater-side notifier 320 sends the message including the MTU value to the mobile station 100, thereby notifying the base station 200 of the MTU value stored in the repeater-side memory 330.

The repeater-side memory 330 stores the MTU value of the destination-side transmission path.

Operation of the mobile communication system will be now described.

Figure 4:
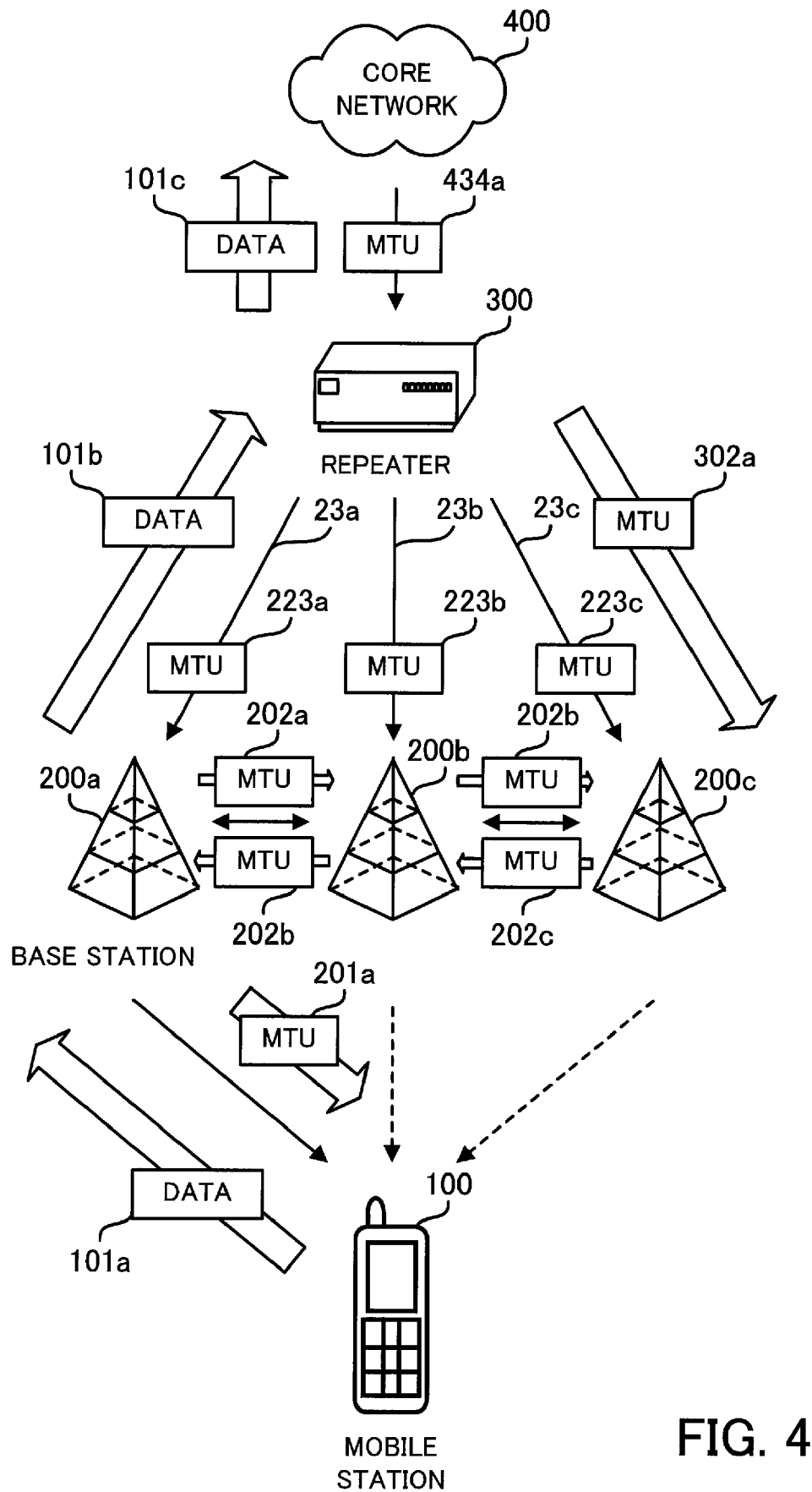
FIG. 4 is a block diagram illustrating operation of the mobile communication system.

FIG. 4 is a block diagram illustrating the operation of the mobile communication system. The mobile communication system illustrated in FIG. 4 permits the mobile station 100 to communicate data with a destination (not illustrated) connected to the core network 400. Assuming that the mobile station 100 is connected with the destination, not illustrated, via the base station 200a, the repeater 300 and the core network 400, by way of example, the manner of how the mobile station 100 acquires the MTU value for setting the size of data to be transmitted therefrom to the destination will be described.

The repeater 300 acquires an MTU value 434a of a transmission path including the transmission path 34 connecting the core network 400 to the repeater 300 and the core network 400. The acquired MTU value 434a is stored in the repeater 300. This MTU value is acquired at regular intervals of time so as to update the MTU value stored in the repeater 300.

Also, the repeater 300 sends the latest MTU value 302a to the base stations 200a to 200c via respective transmission paths 23a to 23c.

The base stations 200a to 200c receive the MTU value 302a notified from the repeater 300.

Also, the base station 200a acquires, by means of the path MTU discovery, an MTU value 223a of the transmission path 23a between the apparatus 200a and the repeater 300. Similarly, the base station 200b acquires an MTU value 223b of the transmission path 23b between the apparatus 200b and the repeater 300, and the base station 200c acquires an MTU value 223c of the transmission path 23c between the apparatus 200c and the repeater 300.

Further, the base station 200a compares the MTU value 302a notified from the repeater 300 with the MTU value 223a of the transmission path 23a acquired thereby, and stores the smaller MTU value therein.

Specifically, when notified of the MTU value 302a from the repeater 300, the base station 200a compares the stored MTU value with the MTU value 302a notified from the repeater 300 and, if the stored value is greater, updates the stored MTU value with the notified MTU value 302a. On the other hand, if it is found as a result of the comparison that the stored MTU value is smaller than or equal to the notified MTU value 302a, the stored MTU value is not updated.

Also, on acquiring the MTU value 223a from the transmission path 23a, the base station 200a compares the stored MTU value with the acquired MTU value 223a of the transmission path 23a and, if the stored value is greater, updates the stored MTU value with the acquired MTU value 223a. On the other hand, if it is found as a result of the comparison that the stored MTU value is smaller than or equal to the acquired MTU value 223a, the stored MTU value is not updated.

Alternatively, on acquiring the MTU value 223a of the transmission path 23a, the base station 200a may update the stored MTU value with the acquired MTU value 223a without making a comparison between the MTU values. Also, when the MTU value 302a is notified from the repeater 300, the base station 200a may update the stored MTU value with the notified MTU value 302a without making a comparison between the MTU values. In this case, the stored MTU value is reset to the MTU value 223a actually acquired from the transmission path 23a and to the MTU value 302a notified from the repeater 300. This prevents the stored MTU value from becoming smaller and smaller, thus making it possible to avoid the situation where, although the actual MTU value of the transmission path has become large, the set data size does not reflect the actual MTU value.

The base stations 200b and 200c update their MTU value in the same manner as explained above.

At the start of an incoming/outgoing call to/from the mobile station 100, the base station 200a notifies the mobile station 100 of the MTU value 201a stored therein. On establishment of connection with the destination, the mobile station 100 starts to communicate data with the destination. At this time, the data 101a bound for the destination is transmitted from the mobile station 100 to the base station 200a with the data size determined based on the MTU value 201a notified from the base station 200a (e.g., data size smaller than or equal to the notified MTU value). Subsequently, the data 101a is forwarded from the base station 200a to the repeater 300 as data 101b, and then from the repeater 300 to the destination as data 101c.

The size of the data 101a to 101c does not exceed the MTU value of the transmission path from the path 23a to the destination unless the network conditions change for the worse, and therefore, the data reaches the destination without being fragmented or discarded.

In this manner, the mobile station 100 transmits data with the data size set on the basis of the acquired MTU value of the transmission path so that the data can be transmitted without being fragmented or discarded at some point on the transmission path.

The base stations 200a to 200c are connected with each other, as illustrated in FIG. 2, and thus can exchange the MTU values respectively stored therein. Accordingly, where a handover of the mobile station 100 is necessary and the base station connected with the mobile station 100 is to be switched from the base station 200a to the base station 200b, for example, the source base station 200a communicates with the destination base station 200b to acquire the MTU value and notifies the mobile station 100 of the acquired MTU value. On receiving the notification, the mobile station 100 starts to transmit data with the data size set on the basis of the notified MTU value.

Thus, also at the time of handover, the mobile station 100 acquires, from the source base station 200a, the MTU value of the transmission path connected to the destination base station 200b, and performs data transmission via the destination base station 200b with the data size set on the basis of the acquired MTU value.

In this manner, following the handover, the mobile station 100 transmits data with the data size set on the basis of the acquired MTU value of the destination base station 200b, whereby the data can be forwarded to the destination without being fragmented or discarded at some point on the transmission path.

Figure 5:
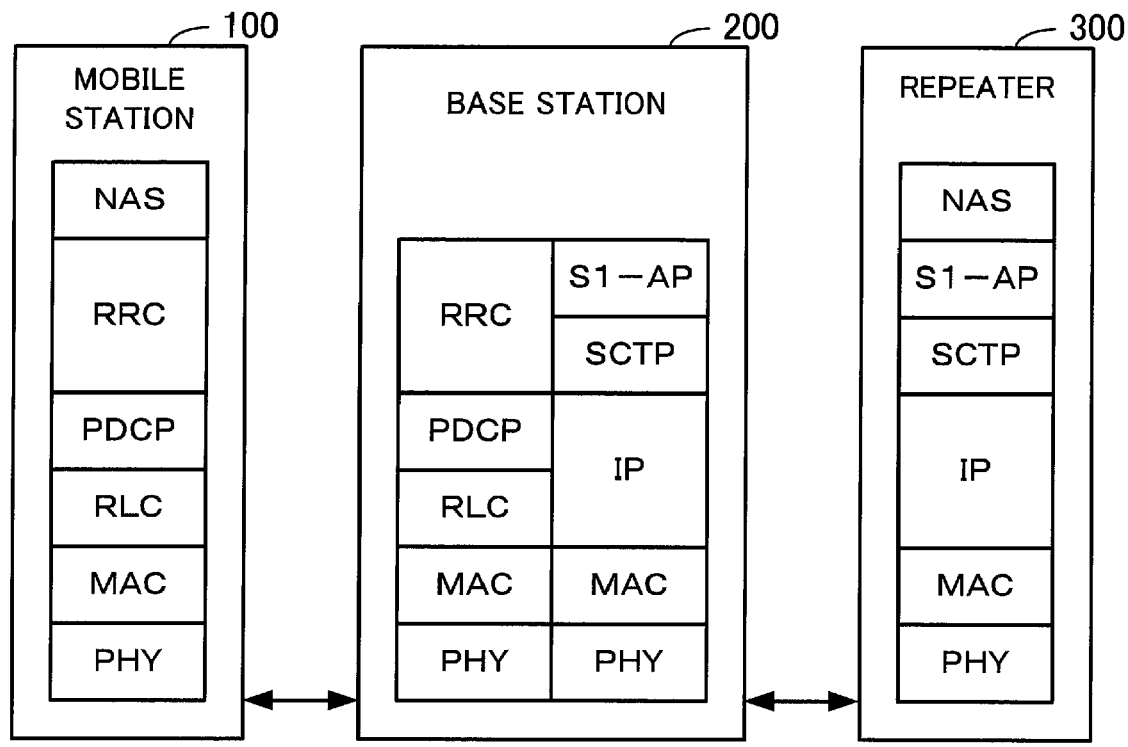
FIG. 5 illustrates protocol stacks associated with S1-AP messaging.

FIG. 5 illustrates protocol stacks associated with S1-AP messaging. In this embodiment, the mobile station 100, the base station 200 and the repeater 300 are serially connected by means of the illustrated protocol stacks.

The protocol stack of the mobile station 100 comprises, for example, PHY (physical layer), MAC (Media Access Control), RLC (Radio Link Control), PDCP (Packet Data Convergence Protocol), RRC (Radio Resource Control), and NAS (Non Access Stratum) from the lowest level upward.

The mobile station-side protocol stack of the base station 200 comprises, from the lowest level upward, PHY, MAC, RLC, PDCP, and RRC.

The repeater-side protocol stack of the base station 200 comprises, from the lowest level upward, PHY, MAC, IP (Internet Protocol), SCTP (Stream Control Transmission Protocol), and S1-AP.

The base station-side protocol stack of the repeater 300 comprises, from the lowest level upward, PHY, MAC, IP, SCTP, S1-AP, and NAS.

Processes executed in the mobile communication system of the embodiment will be now described.

First, a process performed in the mobile communication system at the start of an outgoing/incoming call from/to the mobile station 100 will be explained.

Figure 6:
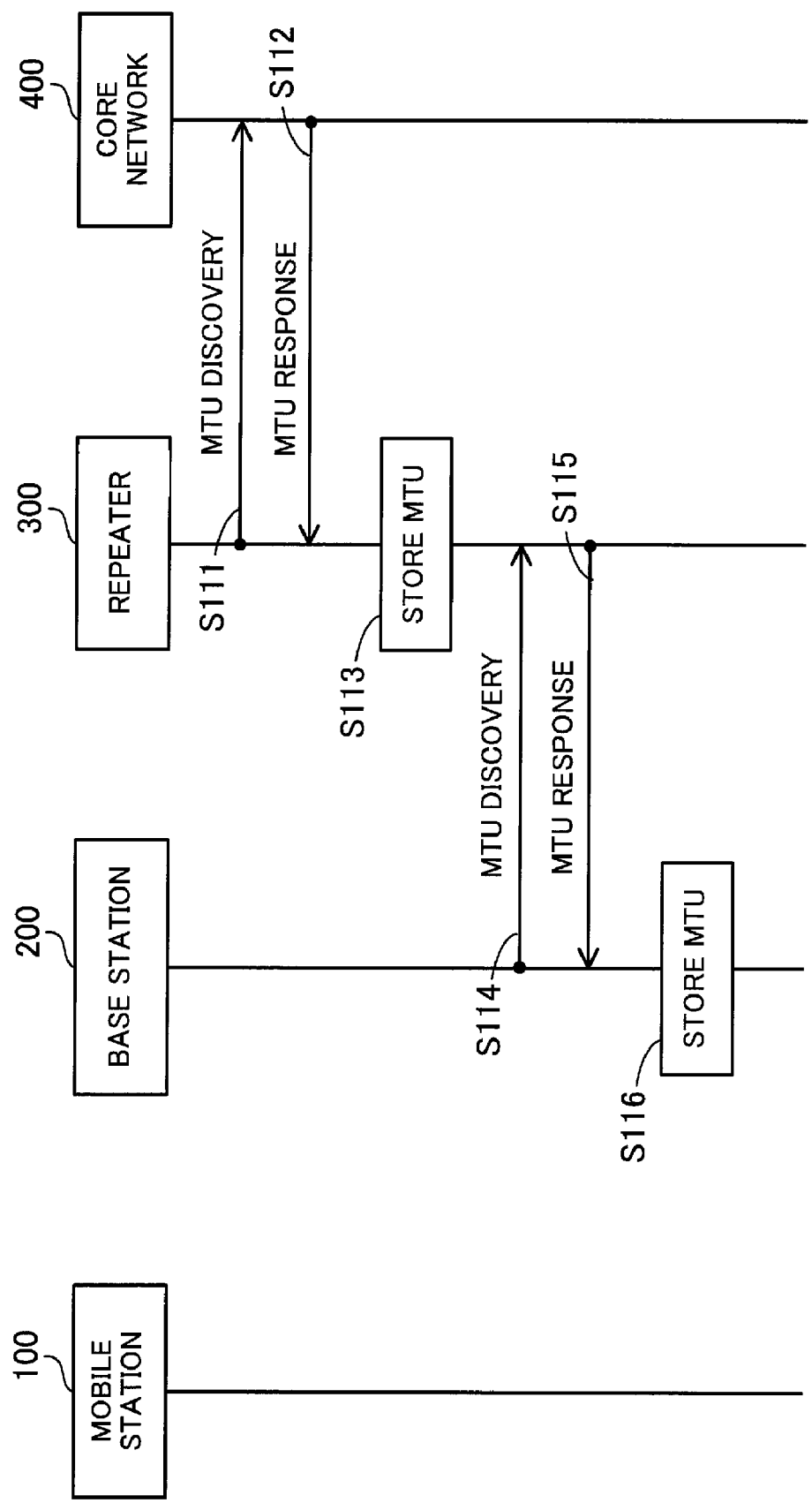
FIG. 6 is a sequence diagram illustrating a procedure from call connection to data transfer.
Figure 7:
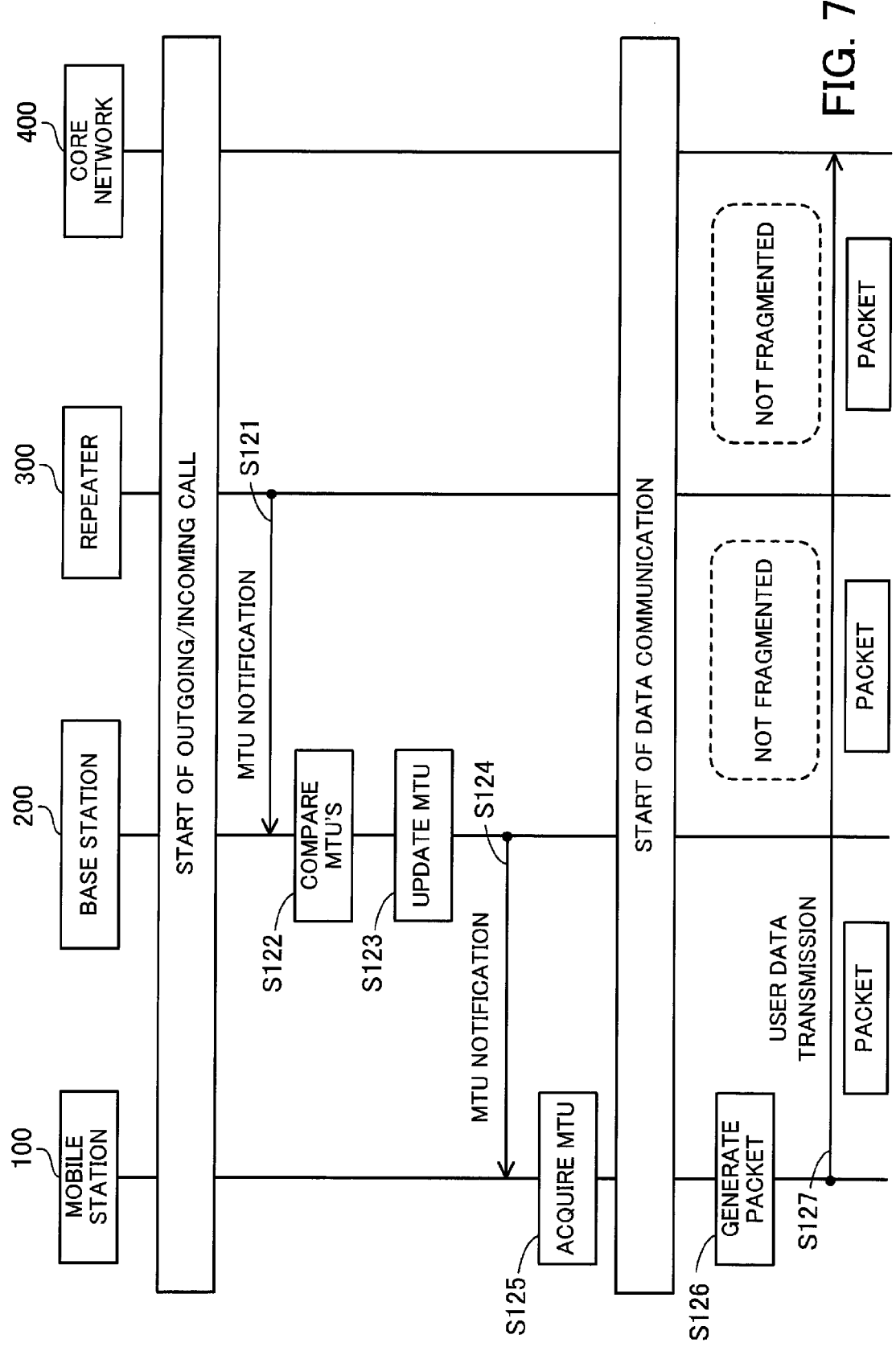
FIG. 7 is a sequence diagram also illustrating the procedure from call connection to data transfer.

FIGS. 6 and 7 are sequence diagrams illustrating a processing procedure from call connection to data transfer.

In mobile communication systems defined by 3GPP LTE (Long Term Evolution), an S1-AP message (S1 UE context setup request) is sent from the repeater 300 to the base station 200 to connect a call with the mobile station 100 that is to initiate/receive an outgoing/incoming call. The S1-AP message transmitted from the repeater 300 to the base station 200 includes the MTU value stored in the repeater 300, whereby the base station 200 is notified of the MTU value from the repeater 300.

On receiving the S1-AP message (S1 UE context setup request), the base station 200 sends an RRC message (SAE radio bearer setup) to the mobile station 100 which is to initiate/receive an outgoing/incoming call. The base station 200 includes, in the RRC message to be transmitted to the mobile station 100, the MTU value stored therein, whereby the mobile station 100 is notified of the MTU value from the base station 200.

In the following, the processing procedure will be explained with reference to FIGS. 6 and 7.

Step S111: The repeater 300 carries out MTU discovery with respect to the core network-side transmission path. The MTU discovery will be described in detail later.

Step S112: The repeater 300 receives, from the core network-side transmission path, a response to the MTU discovery executed in Step S111, and acquires a minimum MTU value of the core network-side transmission path.

In order to prevent the execution of the path MTU discovery from causing increase of the network load and consequent lowering in the transmission efficiency, the repeater 300 carries out the MTU discovery with respect to the transmission path to the core network 400 at regular intervals of time independently of initiation of data communication of terminals, and stores the minimum MTU value of the transmission path to the core network 400 in the repeater-side memory 330.

At this time, the MTU value already stored in the repeater 300 is updated to the newly acquired MTU value, thus making it possible to cope with change of the MTU value due to topology modification. The MTU value can be obtained by a method utilizing the ICMP (path MTU discovery), for example.

Specifically, the path MTU discovery is executed in the following manner. A transmitting side (e.g., repeater 300) transmits, to a destination (e.g., core network 400), an ICMP packet which has a sufficiently large size and of which fragmentation is forbidden. If the size of the transmitted ICMP packet is larger than the smallest one of the MTUs of the transmission path, an error message is returned from a apparatus constituting the transmission path.

When the error message is received, the transmitting side transmits an ICMP packet with a smaller size. This process is repeated with the packet size successively reduced. If a response to an ICMP packet is returned from the destination, the size of the ICMP packet then transmitted is an optimum MTU of the transmission path.

Step S113: The repeater 300 stores the MTU value, acquired in Step S112, in the repeater-side memory 330 as a core network-side MTU value. Where a core network-side MTU value is already stored, the repeater 300 updates the stored MTU value with the currently acquired MTU value.

In this embodiment, the repeater 300 repeatedly executes Steps S111 to S113 at regular intervals of time (e.g., at intervals of 10 minutes). Accordingly, the core network-side MTU value stored in the repeater 300 is periodically updated, making it possible to cope with change in the network topology of the core network-side transmission path.

Step S114: The base station 200 performs MTU discovery with respect to the repeater-side transmission path in the same manner as stated above.

Step S115: The base station 200 receives, from the repeater-side transmission path, a response to the MTU discovery executed in Step S114, and acquires a minimum MTU value of the repeater-side transmission path.

In this embodiment, to prevent the execution of the MTU discovery from causing increase of the network load and consequent lowering in the transmission efficiency, the base station 200 performs the MTU discovery with respect to the transmission path to the repeater 300 at regular intervals of time independently of initiation of data communication of terminals, like the repeater 300, and stores the minimum MTU value of the transmission path to the repeater 300 in the base station-side memory 230.

Step S116: The base station 200 stores the MTU value, acquired in Step S115, in the base station-side memory 230 as a repeater-side MTU value. Where a repeater-side MTU value is already stored, the base station 200 updates the stored MTU value with the currently acquired MTU value.

In this embodiment, the base station 200 repeatedly executes Steps S114 to S116 at regular intervals of time (e.g., at intervals of 10 minutes), like the repeater 300. Accordingly, the repeater-side MTU value stored in the base station 200 is periodically updated, making it possible to cope with change in the network topology of the repeater-side transmission path.

The following describes a process executed when an outgoing/incoming call from/to the mobile station 100 is initiated with the MTU values, acquired as described above, stored in the base station 200 and the repeater 300, respectively.

Step S121: At the start of an outgoing/incoming call from/to the mobile station 100, the repeater 300 sends the MTU value stored in Step S113 (see FIG. 6) to the base station 200 connected with the mobile station 100. The MTU value to be notified is included in an S1-AP message as stated above.

Step S122: On receiving the S1-AP message transmitted in Step S121 from the repeater 300, the base station 200 extracts the MTU value included in the received S1-AP message. Then, the base station 200 compares the MTU value extracted from the S1-AP message with the MTU value stored in the base station-side memory 230 in Step S116 (see FIG. 6).

Step S123: If it is found as a result of the comparison in Step S122 that the notified MTU value is smaller, the base station 200 updates the MTU value stored in the base station-side memory 230 with the notified MTU value. On the other hand, if the MTU value stored in the base station-side memory 230 is smaller than or equal to the notified MTU value, the base station 200 does not update the MTU value.

Step S124: The base station 200 notifies the mobile station 100 of the MTU value stored in the base station-side memory 230. The MTU value to be notified is included in an RRC message as stated above.

Step S125: On receiving the RRC message transmitted in Step S124 from the base station 200, the mobile station 100 extracts the MTU value included in the received RRC message, to acquire the base station-side MTU value.

Subsequently, the mobile station 100 starts data communication by using the MTU value acquired in Step S125. The following describes the manner of how the mobile station 100 transmits data by using the acquired MTU value.

Step S126: Based on the MTU value acquired in Step S125, the mobile station 100 generates, from user data, a packet with a data size equal to the MTU value (or smaller than the MTU value).

Step S127: The mobile station 100 transmits the packet generated in Step S126 from the user data to the core network 400 via the base station 200 and the repeater 300. The packet transmitted at this time has a data size smaller than or equal to the MTU value of the transmission path and thus is forwarded to the destination without being fragmented.

The following describes a process executed in the mobile communication system of the embodiment when an outgoing/incoming call is initiated at multiple mobile stations (e.g., two mobile stations 100a and 100b).

Figure 8:
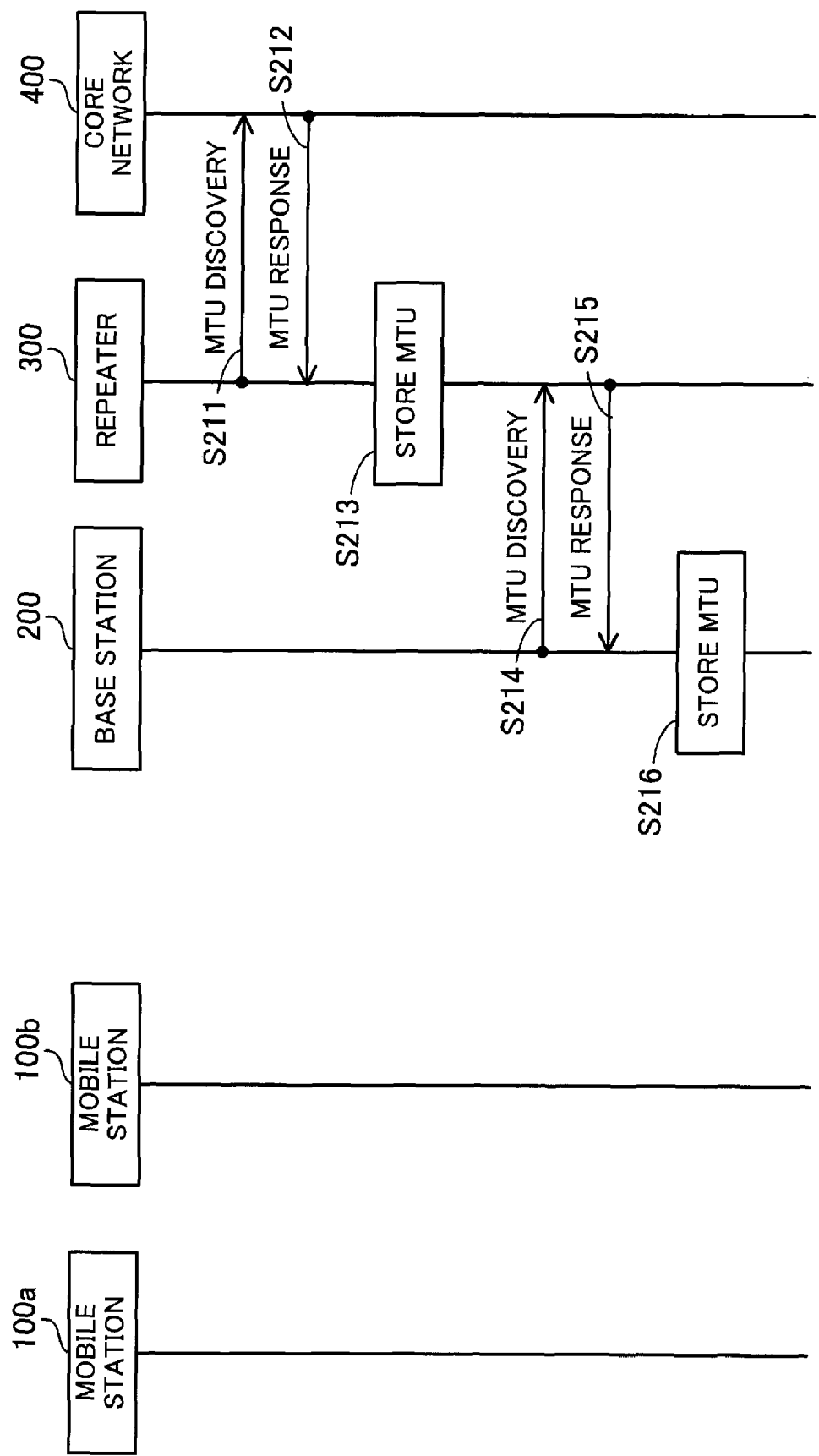
FIG. 8 is a sequence diagram illustrating a procedure from call connection to data transfer with respect to multiple mobile stations.
Figure 9:
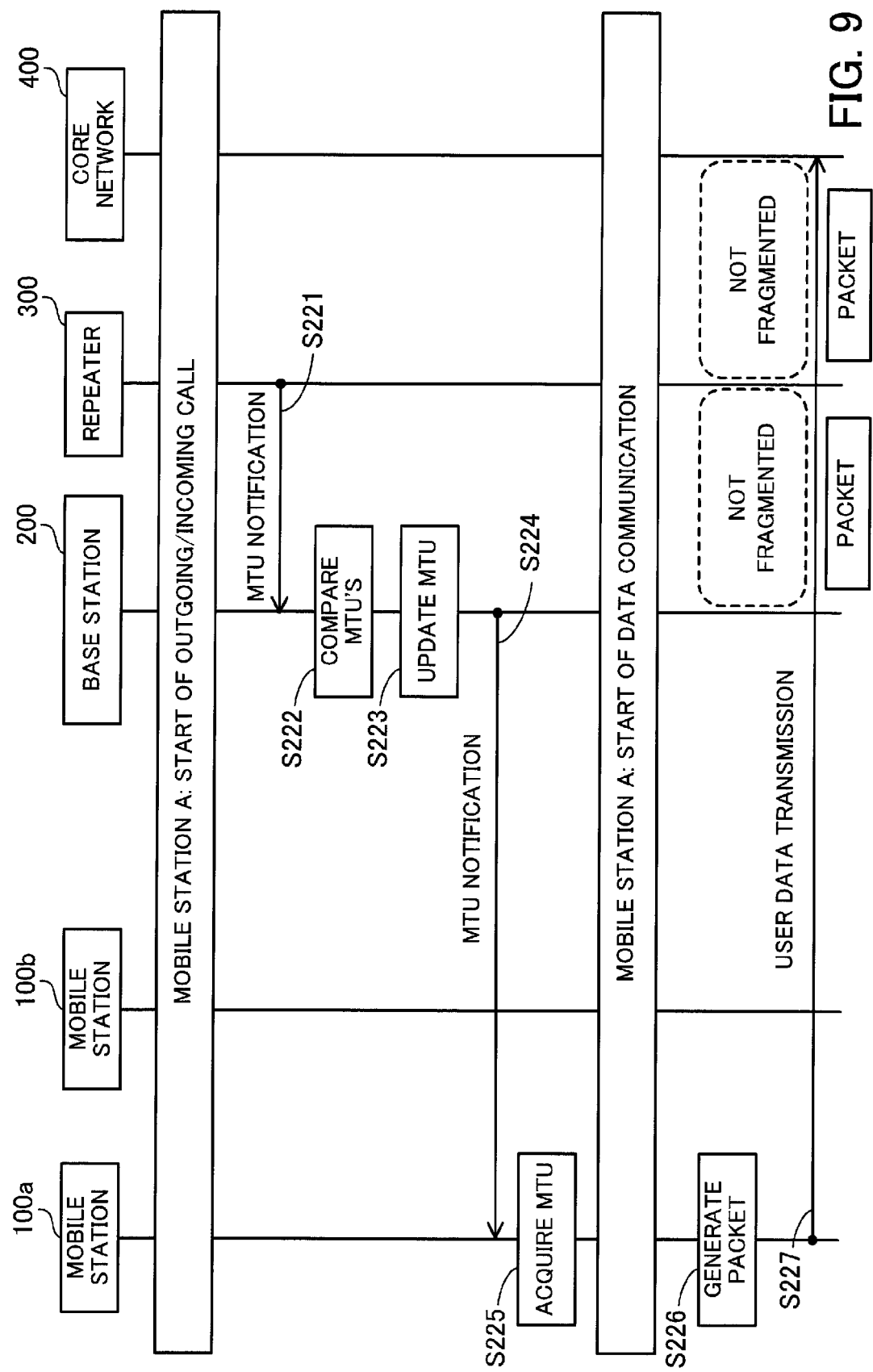
FIG. 9 is a sequence diagram also illustrating the procedure from call connection to data transfer with respect to multiple mobile stations.
Figure 10:
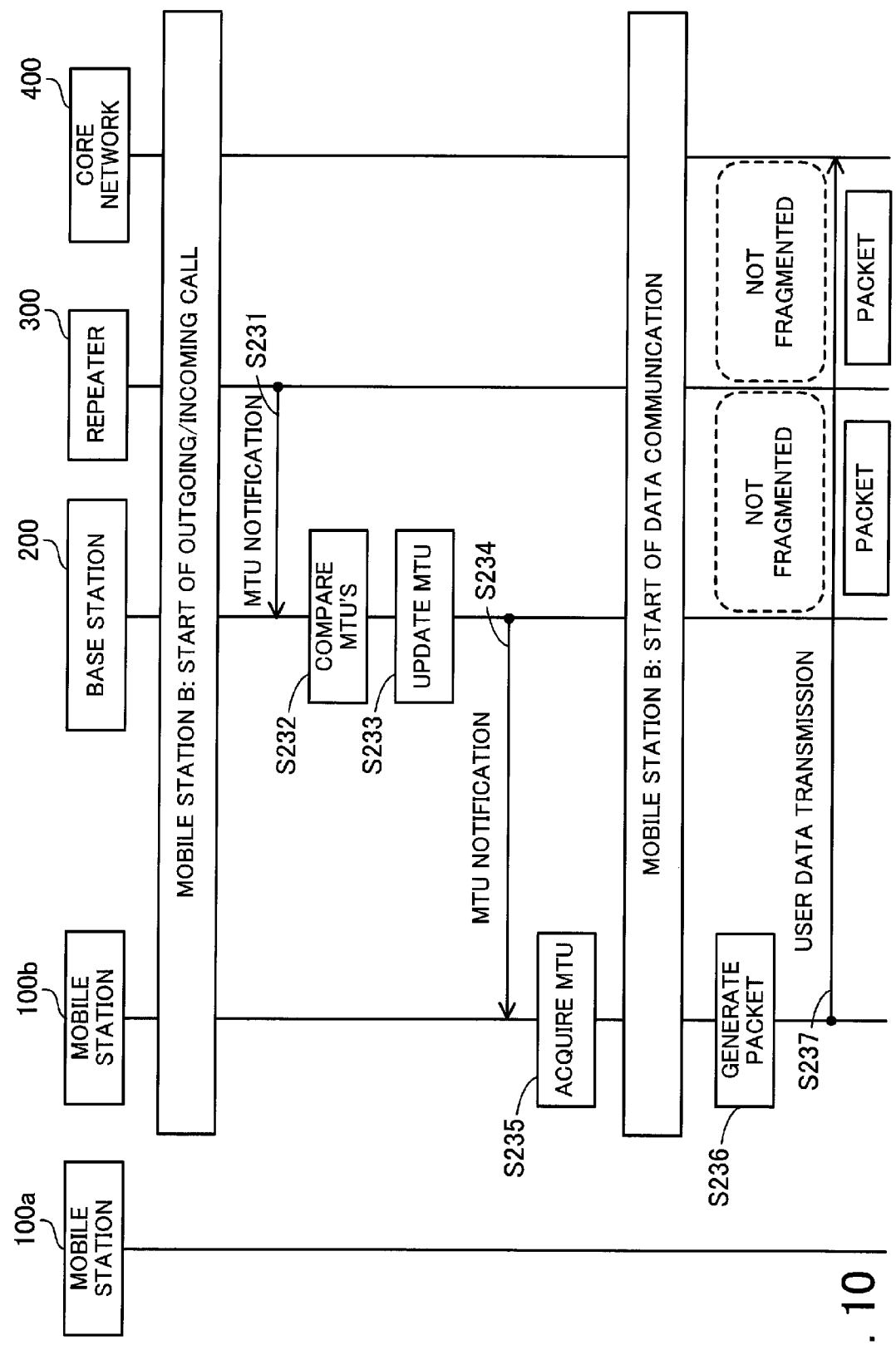
FIG. 10 is a sequence diagram illustrating the procedure from call connection to data transfer with respect to multiple mobile stations.

FIGS. 8 to 10 are sequence diagrams illustrating a processing procedure from call connection to data transfer with respect to multiple mobile stations.

Referring to FIGS. 8 to 10, the processing procedure will be explained.

Step S211: The repeater 300 performs the MTU discovery with respect to the core network-side transmission path.

Step S212: The repeater 300 receives, from the core network-side transmission path, a response to the MTU discovery executed in Step S211, and acquires a minimum MTU value of the core network-side transmission path.

Step S213: The repeater 300 stores the MTU value, acquired in Step S212, in the repeater-side memory 330 as the core network-side MTU value. Where a core network-side MTU value is already stored, the repeater 300 updates the stored MTU value with the currently acquired MTU value.

In this embodiment, the repeater 300 repeatedly executes Steps S211 to S213 at regular intervals of time (e.g., at intervals of 10 minutes).

Step S214: The base station 200 performs the MTU discovery with respect to the repeater-side transmission path in the same manner as stated above.

Step S215: The base station 200 receives, from the repeater-side transmission path, a response to the MTU discovery executed in Step S214, and acquires a minimum MTU value of the repeater-side transmission path.

Step S216: The base station 200 stores the MTU value, acquired in Step S215, in the base station-side memory 230 as the repeater-side MTU value. Where a repeater-side MTU value is already stored, the base station 200 updates the stored MTU value with the currently acquired MTU value.

The following describes a process executed when an outgoing/incoming call is initiated at the mobile stations 100a and 100b with the MTU values, acquired as described above, stored in the base station 200 and the repeater 300, respectively.

Step S221: At the start of an outgoing/incoming call from/to the mobile station 100a (mobile station A), the repeater 300 sends the MTU value stored in Step S213 (see FIG. 8) to the base station 200 connected with the mobile station 100a. The MTU value to be notified is included in an S1-AP message as stated above.

Step S222: On receiving the S1-AP message transmitted in Step S221 from the repeater 300, the base station 200 extracts the MTU value included in the received S1-AP message. Then, the base station 200 compares the MTU value extracted from the S1-AP message with the MTU value stored in Step S216 (see FIG. 8) in the base station-side memory 230.

Step S223: If it is found as a result of the comparison in Step S222 that the notified MTU value is smaller, the base station 200 updates the MTU value stored in the base station-side memory 230 with the notified MTU value. On the other hand, if the MTU value stored in the base station-side memory 230 is smaller than or equal to the notified MTU value, the base station 200 does not update the MTU value.

Step S224: The base station 200 notifies the mobile station 100a of the MTU value stored in the base station-side memory 230. The MTU value to be notified is included in an RRC message as stated above.

Step S225: On receiving the RRC message transmitted in Step S224 from the base station 200, the mobile station 100a extracts the MTU value included in the received RRC message, to acquire the base station-side MTU value.

Subsequently, the mobile station 100a starts data communication by using the MTU value acquired in Step S225. The following describes the manner of how the mobile station 100a transmits data by using the acquired MTU value.

Step S226: Based on the MTU value acquired in Step S225, the mobile station 100a generates, from user data, a packet with a data size equal to the MTU value (or smaller than the MTU value).

Step S227: The mobile station 100a transmits the packet generated in Step S226 from the user data to the core network 400 via the base station 200 and the repeater 300. The packet transmitted at this time has a data size smaller than or equal to the MTU value of the transmission path and thus reaches the destination without being fragmented.

Step S231: At the start of an outgoing/incoming call from/to the mobile station 100b (mobile station B), the repeater 300 sends the MTU value stored in Step S213 (see FIG. 8) to the base station 200 connected with the mobile station 100b. The MTU value to be notified is included in an S1-AP message as stated above.

Step S232: On receiving the S1-AP message transmitted in Step S231 from the repeater 300, the base station 200 extracts the MTU value included in the received S1-AP message. Subsequently, the base station 200 compares the MTU value extracted from the S1-AP message with the MTU value stored in Step S216 (see FIG. 8) in the base station-side memory 230.

Step S233: If it is found as a result of the comparison in Step S232 that the notified MTU value is smaller, the base station 200 updates the MTU value stored in the base station-side memory 230 with the notified MTU value. On the other hand, if the MTU value stored in the base station-side memory 230 is smaller than or equal to the notified MTU value, the base station 200 does not update the MTU value.

Step S234: The base station 200 notifies the mobile station 100b of the MTU value stored in the base station-side memory 230. The MTU value to be notified is included in an RRC message as mentioned above.

Step S235: On receiving the RRC message transmitted in Step S234 from the base station 200, the mobile station 100b extracts the MTU value included in the received RRC message, to acquire the MTU value.

Subsequently, the mobile station 100b starts data communication by using the MTU value acquired in Step S235. The following describes the manner of how the mobile station 100b transmits data by using the acquired MTU value.

Step S236: Based on the MTU value acquired in Step S235, the mobile station 100b generates, from user data, a packet with a data size equal to the MTU value (or smaller than the MTU value).

Step S237: The mobile station 100b transmits the packet generated in Step S236 from the user data to the core network 400 via the base station 200 and the repeater 300. The packet transmitted at this time has a data size smaller than or equal to the MTU value of the transmission path and thus is forwarded to the destination without being fragmented.

In this manner, in the mobile communication system of the embodiment, the base station 200 and the repeater 300 individually carry out the MTU discovery at regular intervals of time independently of each other. Accordingly, when an outgoing/incoming call is initiated at multiple mobile stations, no MTU discovery is executed in consequence of the initiation of the outgoing/incoming call at the multiple mobile stations. Instead, at the start of an outgoing/incoming call from/to a mobile station, the MTU value stored in the repeater 300 is included in an S1-AP message and transmitted from the repeater 300 to the base station 200, and the MTU value stored in the base station 200 is included in an RRC message and transmitted from the base station 200 to the mobile station. Thus, even if an outgoing/incoming call is initiated simultaneously or consecutively at multiple mobile stations, the MTU discovery need not be executed in response to each call. Consequently, the load of the transmission path can be prevented from being increased due to the execution of multiple MTU discoveries, yet it is possible to notify the call-initiating mobile stations of the MTU value.

The following describes a process executed in the mobile communication system of the embodiment when the mobile station 100 connected to the base station 200a is handed over to the base station 200b.

Figure 11:
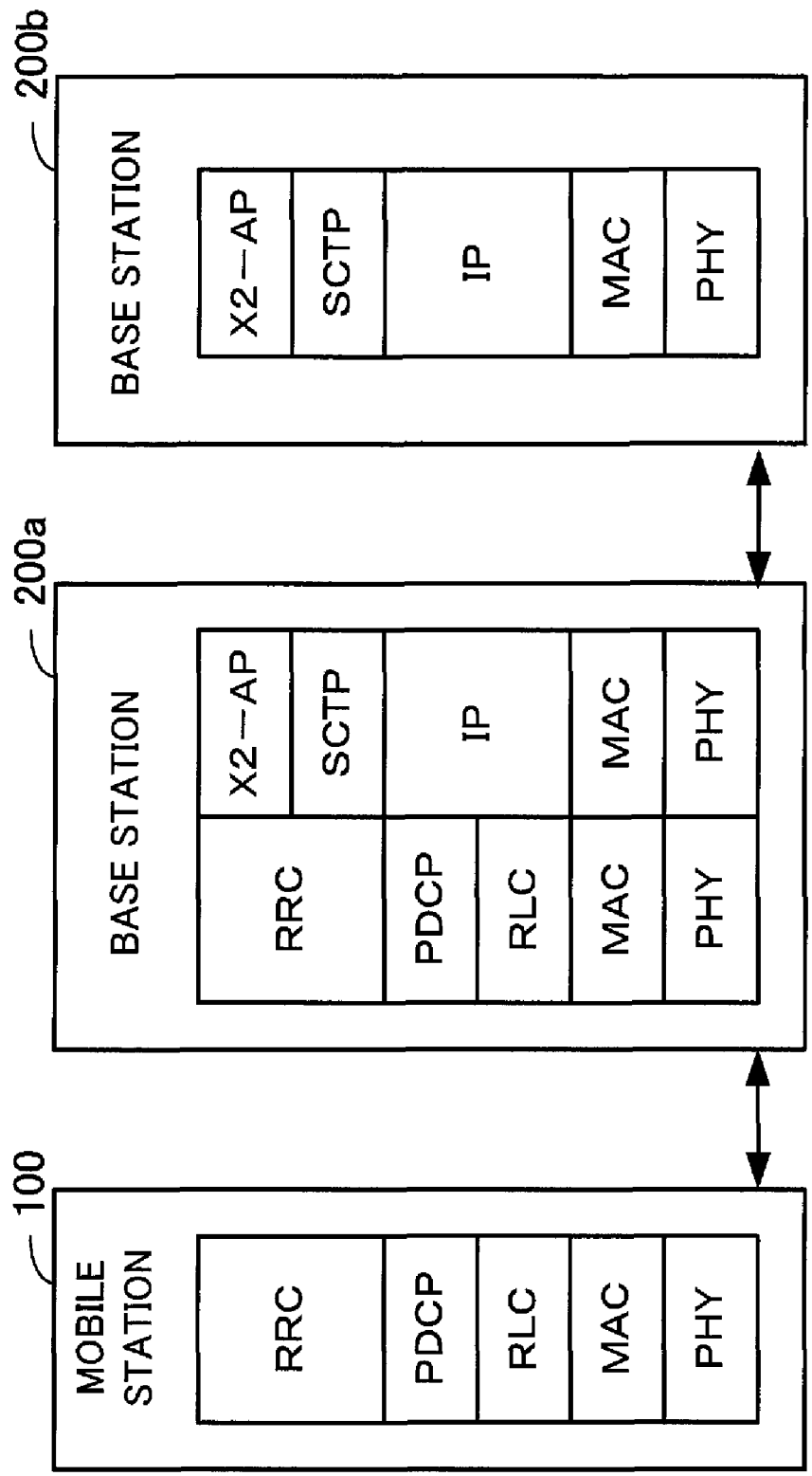
FIG. 11 illustrates protocol stacks associated with X2-AP messaging.

FIG. 11 illustrates protocol stacks related with X2-AP messaging. At the time of handover, the mobile station 100 and the base stations 200a and 200b are connected by means of the illustrated protocol stacks.

The protocol stack of the mobile station 100 comprises, from the lowest level upward, PHY, MAC, RLC, PDCP, and RRC.

The mobile station-side protocol stack of the source base station 200a from which the mobile station 100 is handed over comprises, from the lowest level upward, PHY, MAC, RLC, PDCP, and RRC, like the one illustrated in FIG. 5.

The destination base station-side protocol stack of the source base station 200a comprises, from the lowest level upward, PHY, MAC, IP, SCTP, and X2-AP.

The source base station-side protocol stack of the destination base station 200b comprises, from the lowest level upward, PHY, MAC, IP, SCTP, and X2-AP.

The following describes the procedure of a process executed in the mobile communication system of the embodiment at the time of handover.

Figure 12:
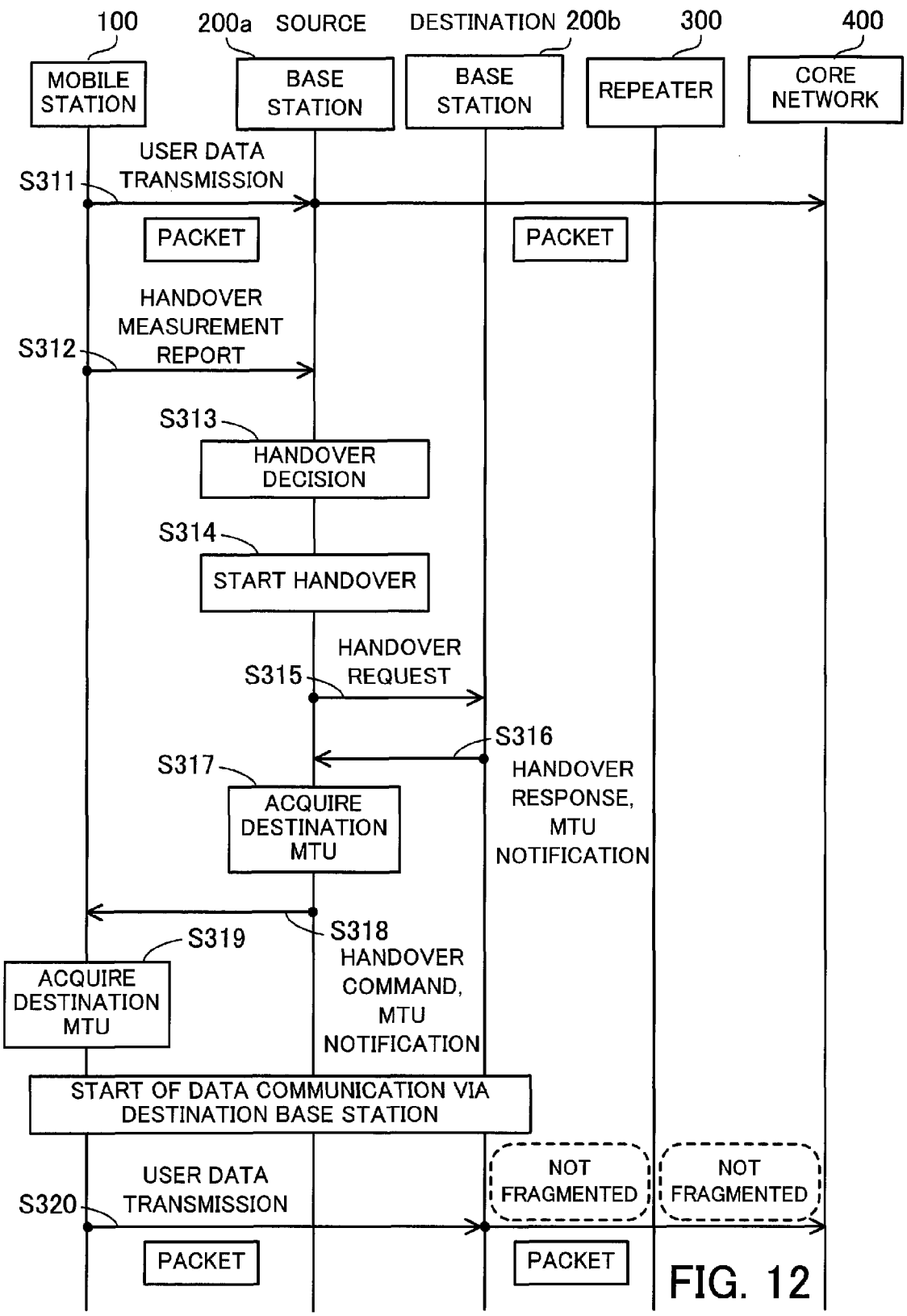
FIG. 12 is a sequence diagram illustrating a handover procedure.

FIG. 12 is a sequence diagram illustrating a handover procedure.

Let us suppose the case where, in the mobile communication system, a handover of the mobile station takes place because of movement of the mobile station. At the time of handover from the source base station to the destination base station, the MTU value of the source-side transmission path generally differs from that of the destination-side transmission path. Thus, if data is transmitted from the mobile station to the destination-side transmission path with the data size set on the basis of the MTU value of the source-side transmission path even though the MTU value of the destination-side transmission path is smaller than that of the source-side transmission path, the data transmitted from the mobile station is fragmented at some point on the destination-side transmission path, possibly lowering the transmission efficiency of the transmission path. Where the MTU value of the destination-side transmission path is greater than that of the source-side transmission path, on the other hand, the MTU value is smaller than necessary, also creating the possibility of the transmission efficiency being lowered.

At the time of handover between base stations in the LTE system, the source base station sends an X2-AP message (Handover Request) to the destination base station to notify same of the start of a handover.

In the mobile communication system of this embodiment, when the X2-AP message (Handover Request) is received from the base station 200a, which is the source apparatus from which the mobile station is handed over, the base station 200b, which is the destination apparatus to which the mobile station is handed over, notifies the base station 200a of the MTU value stored therein by using an X2-AP message (Handover request Ack) sent as a response to the base station 200a.

When the X2-AP message (Handover request Ack) is received from the base station 200b, the base station 200a obtains connection information of the base station 200b and also extracts the MTU value of the base station 200b from the X2-AP message (Handover request Ack). Then, the base station 200a includes the extracted MTU value in an RRC message (Handover command) and sends the message to the mobile station 100 which is being handed over.

The mobile station 100 adjusts the transmit packet size in accordance with the MTU value extracted from the received handover command, and transmits packets to the destination base station 200b, whereby user data is transmitted via the transmission path including the base station 200b.

The following describes, with reference to FIG. 12, a process executed in the mobile communication system of the embodiment when the mobile station 100 communicating with the source base station 200a is handed over to the destination base station 200b.

Step S311: The mobile station 100 is transmitting user data by sending packets to the destination via the source base station 200a, the repeater 300, and the core network 400. Each packet being transmitted has a data size smaller than or equal to the MTU value of the transmission path including the base station 200a, and thus is transmitted to the destination without being fragmented at some point on the transmission path including the base station 200a.

Step S312: The mobile station 100 transmits a handover measurement report notification.

Step S313: On receiving the handover measurement report notification transmitted in Step S312 from the mobile station 100, the source base station 200a makes a handover decision to determine whether to perform a handover.

Step S314: If it is judged by the handover decision in Step S313 that a handover needs to be executed, the base station 200a starts the handover.

Step S315: The base station 200a transmits a handover request to the destination base station 200b. The aforementioned X2-AP message (Handover Request) is used to send the handover request.

Step S316: On receiving the handover request from the base station 200a, the base station 200b transmits a handover response to the base station 200a. The handover response is transmitted by using the aforementioned X2-AP message (Handover request Ack). Also, the handover response includes the repeater-side MTU value stored in the base station 200b.

Step S317: On receiving the handover response transmitted in Step S316 from the base station 200b, the base station 200a extracts the MTU value included in the received handover response, thereby acquiring the repeater-side MTU value held by the base station 200b.

Step S318: The base station 200a transmits a handover command to the mobile station 100. The aforementioned RRC message (Handover command) is used to send the handover command. Also, the handover command includes the MTU value acquired in Step S317.

Step S319: On receiving the handover command transmitted in Step S318 from the base station 200a, the mobile station 100 extracts the MTU value included in the received handover command, to acquire the repeater-side MTU value held by the base station 200b.

Step S320: The mobile station 100 transmits a packet generated from user data to the core network 400 via the base station 200b and the repeater 300. The packet transmitted has a data size smaller than or equal to the MTU value of the transmission path including the base station 200b, and thus can be transmitted to the destination without being fragmented at some point on the transmission path including the destination base station 200b.

Thus, also at the time of handover, the mobile station 100 can acquire the MTU value of the destination base station 200b by extracting the MTU value included in the handover command message. Accordingly, the mobile station 100 need not perform the MTU discovery, and it is also possible to prevent the network load from being increased due to the execution of fragmentation by the destination base station 200b.

The following describes processes executed in the mobile communication system of the embodiment when a non-operating base station is restarted.

In this embodiment, when operation of the base station 200 is restarted, the MTU value to be set in the base station 200 after the restart of operation is included in a restart command message which is transmitted from the repeater 300 connected with the base station 200 and which instructs the base station 200 to execute a restart process. The base station 200 (or some other associated node) extracts the MTU value from the received restart command message and stores the extracted MTU value in the base station-side memory 230. When an incoming/outgoing call to/from the mobile station 100 is initiated thereafter, the base station 200 sends an RRC message including the MTU value stored therein to the mobile station 100.

Where the mobile communication system of the embodiment is constituted by an LTE system, operation of the base station 200 is restarted following the procedure described below.

Figure 13:
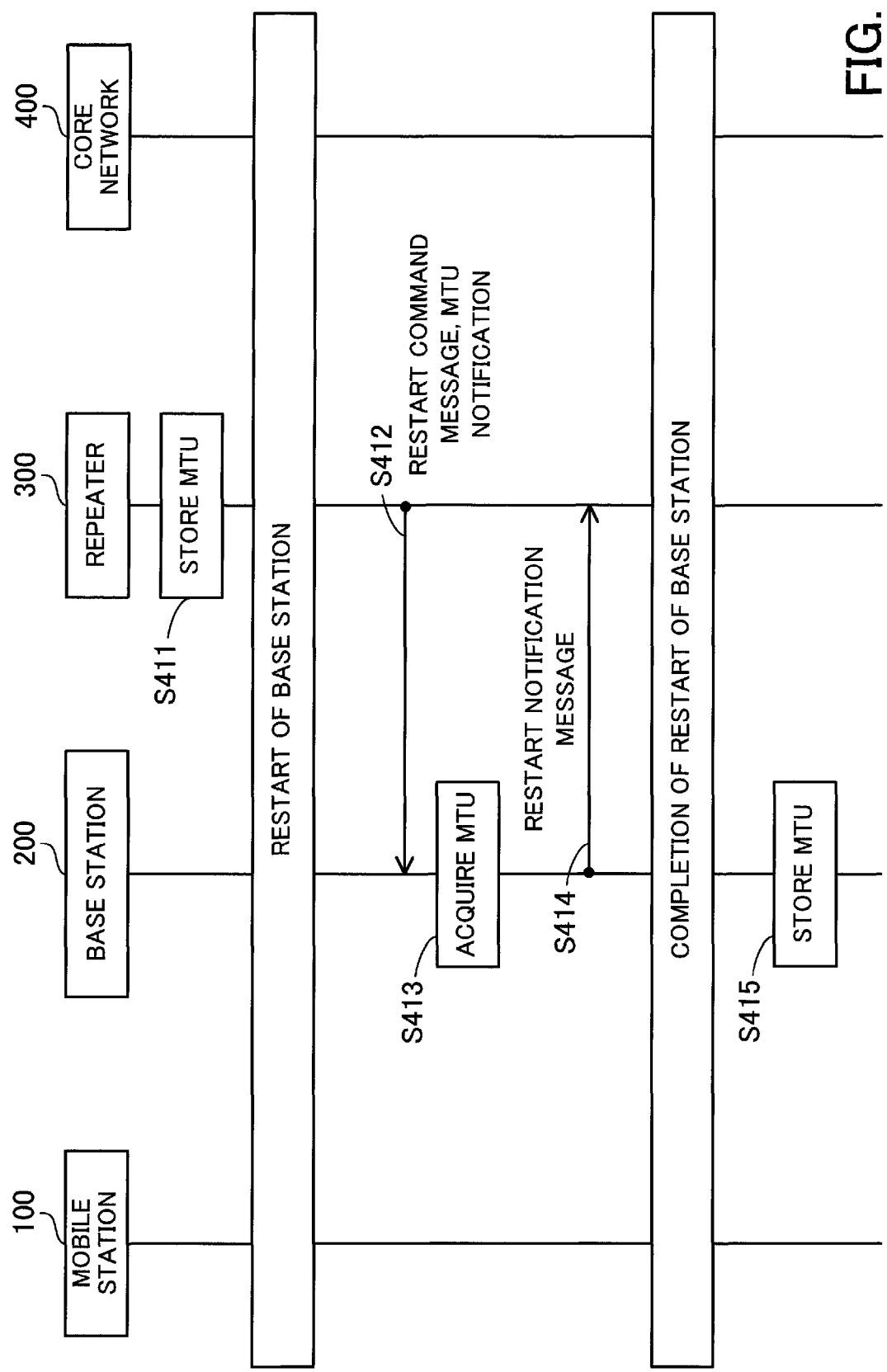
FIG. 13 is a sequence diagram illustrating a procedure for restarting a base station in an LTE system.

FIG. 13 is a sequence diagram illustrating the procedure for restarting the base station in the LTE system.

Step S411: The repeater 300 acquires the core network-side MTU value by means of the path MTU discovery and stores the acquired MTU value in the repeater-side memory 330. Where a core network-side MTU value is already stored, the repeater 300 updates the stored value with the currently acquired MTU value.

Step S412: The repeater 300 transmits a restart command message to the base station 200. The restart command message includes the MTU value stored in Step S411. Thus, the MTU value that is to be set in the base station 200 to be restarted is sent from the repeater 300 to the base station 200.

Step S413: On receiving the restart command message transmitted in Step S412 from the repeater 300, the base station 200 extracts the MTU value included in the received RRC message, to acquire the base station-side MTU value.

Step S414: After receiving the restart command message transmitted in Step S412 from the repeater 300, the base station 200 executes a restart process. On restart of operation by the restart process, the base station 200 sends the repeater 300 a restart notification message indicative of the restart of operation. The restart of operation of the base station 200 is thereafter completed.

Step S415: The base station 200 stores the MTU value, acquired in Step S413, in the base station-side memory 230. When an incoming/outgoing call to/from the mobile station 100 is initiated thereafter, the base station 200 sends an RRC message including the MTU value stored therein to the mobile station 100, as stated above.

Thus, also when operation of the base station 200 is restarted, the MTU value held by the repeater 300 is transmitted to the base station 200. Accordingly, the base station 200 need not perform the MTU discovery when restarted, making it possible to prevent the network load from being increased at the restart of the base station.

Where the mobile communication system of the embodiment is constituted by a 3G system, operation of the base station 200 is restarted following the procedure described below. In the 3G system, a node B application part (NBAP) message is used when operation of the base station 200 is restarted.

Figure 14:
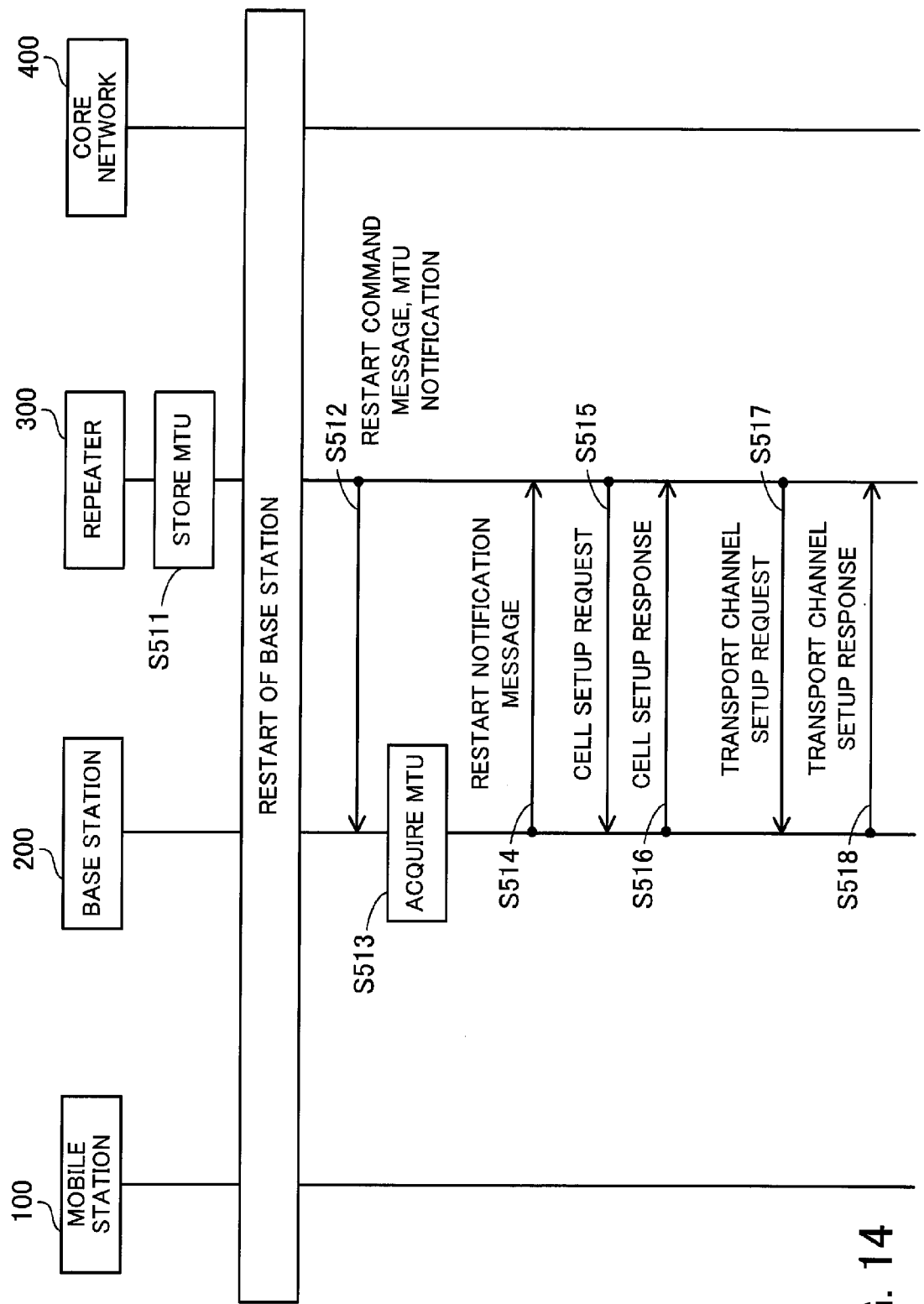
FIG. 14 is a sequence diagram illustrating a procedure for restarting a base station in a 3G system.

FIGS. 14 and 15 are sequence diagrams illustrating the procedure for restarting the base station in the 3G system.

Step S511: The repeater 300 acquires the core network-side MTU value by means of the path MTU discovery and stores the acquired MTU value in the repeater-side memory 330. Where a core network-side MTU value is already stored, the repeater 300 updates the stored value with the currently acquired MTU value.

Step S512: The repeater 300 transmits a restart command message to the base station 200. The restart command message includes the MTU value stored in Step S511. Thus, the MTU value that is to be set in the base station 200 to be restarted is sent from the repeater 300 to the base station 200.

Step S513: On receiving the restart command message transmitted in Step S512 from the repeater 300, the base station 200 extracts the MTU value included in the received RRC message, to acquire the base station-side MTU value.

Step S514: After receiving the restart command message transmitted in Step S512 from the repeater 300, the base station 200 executes a restart process. Upon restart of operation by the restart process, the base station 200 sends the repeater 300 a restart notification message indicating the restart of operation.

Step S515: On receiving the restart notification message transmitted in Step S514 from the base station 200, the repeater 300 transmits a cell setup request to the base station 200. The cell setup request is transmitted by using an NBAP (Cell Setup Request) message.

Step S516: On receiving the cell setup request transmitted in Step S515 from the repeater 300, the base station 200 transmits a cell setup response to the repeater 300. The cell setup response is transmitted by means of an NBAP (Cell Setup Response) message. Steps S515 and S516 are repeated for respective sectors of the base station 200.

Step S517: On receiving the cell setup response transmitted in Step S516 from the base station 200, the repeater 300 transmits a common transport channel setup request to the base station 200. The common transport channel setup request is transmitted by using an NBAP (Common Transport Channel Setup Request) message. Also, the common transport channel setup request is sent via the PCH (Paging CHannel) or FACH (Forward Access CHannel) mapped onto the SCCPCH (Secondary Common Control Physical CHannel).

Step S518: On receiving the common transport channel setup request transmitted in Step S517 from the repeater 300, the base station 200 transmits a common transport channel setup response to the repeater 300. The common transport channel setup response is transmitted by means of an NBAP (Common Transport Channel Setup Response) message via the SCCPCH. Steps S517 and S518 are repeated for the respective sectors of the base station 200.

Step S521: On receiving the common transport channel setup response transmitted in Step S518 (see FIG. 14) from the base station 200, the repeater 300 transmits an establish request to the base station 200. The establish request is transmitted by means of an ALCAP (Access Link Control Application Protocol) message (Establish Request message).

Step S522: On receiving the establish request transmitted in Step S521 from the repeater 300, the base station 200 transmits an establish response to the repeater 300. The establish response is transmitted by using an ALCAP (Establish Response) message. Steps S521 and S522 are repeated for respective transport channels of the base station 200.

Step S523: On receiving the establish response transmitted in Step S522 from the base station 200, the repeater 300 transmits a common transport channel setup request to the base station 200. This request is transmitted by means of an NBAP (Common Transport Channel Setup Request) message. Also, the common transport channel setup request is sent via the RACH (Random Access CHannel) mapped onto the SCCPCH.

Step S524: On receiving the common transport channel setup request transmitted in Step S523 from the repeater 300, the base station 200 transmits a common transport channel setup response to the repeater 300. This response is transmitted by means of an NBAP (Common Transport Channel Setup Response) message. Also, the common transport channel setup response is sent via the SCCPCH. Steps S523 and S524 are repeated for the respective sectors of the base station 200.

Step S525: On receiving the common transport channel setup response transmitted in Step S524 from the base station 200, the repeater 300 transmits an establish request to the base station 200. The establish request is transmitted by means of an ALCAP (Establish Request) message.

Step S526: On receiving the establish request transmitted in Step S525 from the repeater 300, the base station 200 transmits an establish response to the repeater 300. The establish response is transmitted by using an ALCAP (Establish Response) message. Steps S525 and S526 are repeated for the respective transport channels of the base station 200.

Step S527: On receiving the establish response transmitted in Step S526 from the base station 200, the repeater 300 transmits a system information update request to the base station 200. The system information update request is transmitted by using an NBAP (System Information Update Request) message.

Step S528: On receiving the system information update request transmitted in Step S527 from the repeater 300, the base station 200 transmits a system information update response to the repeater 300. The system information update response is transmitted by means of an NBAP (System Information Update Response) message. Steps S527 and S528 are repeated for the respective sectors of the base station 200.

Step S529: The base station 200 stores the MTU value, acquired in Step S513, in the base station-side memory 230. When an incoming/outgoing call to/from the mobile station 100 is initiated thereafter, the base station 200 transmits an RRC message including the MTU value stored therein to the mobile station 100 as stated above.

Also in the mobile communication system constituted by a 3G system, when operation of the base station 200 is restarted, the MTU value held by the repeater 300 is sent to the base station 200. Since the MTU discovery need not be performed when operation of the base station 200 is restarted, it is possible to prevent the network load from being increased at the restart of the base station.

As described above, according to the embodiment, the MTU value of the transmission path via which data is to be transmitted is acquired and notified to the mobile station. It is therefore possible to cause the mobile station to transmit data with a data size matching the MTU value of the transmission path while at the same time restraining increase of the load on the apparatuses constituting the transmission path.

Also, each base station 200 updates the MTU value stored therein to the latest value at predetermined intervals of time, and accordingly, the size of data transmitted from the mobile station 100 can be made to change in accordance with change in the network configuration (topology change).

Further, each repeater 300 updates the MTU value stored therein to the latest value at predetermined intervals of time, and therefore, the size of data transmitted from the mobile station 100 can be made to change in accordance with change in the network configuration.

Moreover, the base station 200 acquires one MTU value, and when a call connection is initiated at multiple mobile stations 100a, 100b, the MTU value is sent to the individual mobile stations 100a, 100b. Since the mobile stations 100a, 100b need not carry out the path MTU discovery, the network load can be prevented from increasing due to the MTU discovery, making it possible to prevent lowering in the transmission efficiency of the network.

In the disclosed mobile communication system and method and communication apparatus, the MTU of the transmission path is acquired and notified to the terminal apparatus. It is therefore possible to cause the mobile station to transmit data with a data size matching the MTU value while at the same time restraining increase in the load of the apparatuses constituting the transmission path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions and alterations could be made hereto without departing from the spirit and scope of the invention.

What is claimed is:

1. A mobile communication system for wireless data communication, the system comprising:
    a repeater which includes:
        a repeater-side acquirer which acquires a Maximum Transmission Unit (MTU) value indicative of a maximum size of data that can be transferred at a time over a destination-side transmission path leading to a destination of data to be transmitted from the mobile station,
        a repeater-side memory which stores the acquired MTU value of the destination-side transmission path, and
        a repeater-side notifier which sends out the MTU value stored in the repeater-side memory;
    a base station which includes:
        a base station-side acquirer which acquires the MTU value sent out by the repeater-side notifier,
        a base station-side memory which stores the MTU value acquired by the base station-side acquirer, and
        a base station-side notifier which sends out the MTU value stored in the base station-side memory; and
    a mobile station which includes:
        a mobile station-side acquirer which acquires the MTU value sent out by the base station-side notifier,
        a mobile station-side memory which stores the MTU value acquired by the mobile station-side acquirer, and
        a mobile station-side transmitter which transmits the data to the destination with a data size of the data set to be smaller than or equal to the MTU value stored in the mobile station-side memory.

2. The mobile communication system according to claim 1, wherein:
    when the mobile station is to be handed over to a destination base station, the base station-side acquirer acquires from the destination base station the MTU value of a destination-side transmission path to which the destination base station is connected, and stores the acquired MTU value in the base station-side memory; and
    after the MTU value acquired from the destination base station is stored in the base station-side memory, the base station-side notifier notifies the mobile station of the MTU value acquired from the destination base station.

3. The mobile communication system according to claim 1, wherein, when operation of the base station is started, the repeater-side notifier notifies the base station-side acquirer of the MTU value stored in the repeater-side memory, and the base station-side acquirer acquires the MTU value from the repeater-side notifier and stores the acquired MTU value in the base station-side memory.

4. The mobile communication system according to claim 1, wherein, when a call connection is initiated at the mobile station, the base station-side notifier notifies the mobile station of the MTU value stored in the base station-side memory.

5. The mobile communication system according to claim 1, wherein the base station-side notifier includes, in a message used for a call connection with the mobile station, the MTU value stored in the base station-side memory and transmits the message to the mobile station, thereby notifying the mobile station of the MTU value stored in the base station-side memory.

6. The mobile communication system according to claim 1, wherein the repeater-side notifier includes, in a message used for a call connection with the mobile station, the MTU value stored in the repeater-side memory and transmits the message to the mobile station, to notify the base station of the MTU value stored in the repeater-side memory.

7. The mobile communication system according to claim 1, wherein the base station-side acquirer acquires the MTU value of the destination-side transmission path at predetermined intervals of time and updates the MTU value stored in the base station-side memory with the acquired MTU value.

8. The mobile communication system according to claim 1, wherein the repeater-side acquirer acquires the MTU value of the destination-side transmission path at predetermined intervals of time and updates the MTU value stored in the repeater-side memory with the acquired MTU value.

9. A mobile communication method for wireless data communication in a system including a base station, a mobile station, and a repeater, the method comprising:
    acquiring, by the repeater, a Maximum Transmission Unit (MTU) value indicative of a maximum size of data that can be transferred at a time over a destination-side transmission path leading to a destination of data to be transmitted from the mobile station;
    storing the acquired MTU value of the destination-side transmission path in the repeater;
    notifying, by the repeater, the base station of the MTU value stored in the repeater;
    acquiring, by the base station, the MTU value notified of by the repeater;
    storing the acquired MTU value in the base station;
    notifying the mobile station of the stored MTU value by the base station;
    acquiring, by the mobile station, the MTU value notified of by the base station;
    storing the acquired MTU value in the mobile station; and
    transmitting the data from the mobile station to the destination with a data size of the data set to be smaller than or equal to the stored MTU value.

10. A repeater coupled to a base station in a mobile communication system to deliver data transmitted from a mobile station, the repeater comprising:
    an acquirer which acquires a Maximum Transmission Unit (MTU) value indicative of a maximum size of data that can be transferred at a time over a destination-side transmission path leading to a destination of data to be transmitted from the mobile station;

a memory which stores the acquired MTU value of the destination-side transmission path; and a notifier which notifies the base station of the MTU value stored in the memory, so that the base station further notifies the mobile station of the MTU value, and so that the mobile station transmits the data to the destination with a data size smaller than or equal to the MTU value.

* * * * *